(12) United States Patent
Kushida

(10) Patent No.: US 9,057,870 B2
(45) Date of Patent: Jun. 16, 2015

(54) ZOOM LENS

(71) Applicants: Sintai Optical (Shenzhen) Co., Ltd., Shenzhen, Guandong Province (CN); Asia Optical International Ltd., Tortola (GB)

(72) Inventor: Taro Kushida, Shenzhen (CN)

(73) Assignees: SINTAI OPTICAL (SHENZHEN) CO., LTD., Shenzhen, Guandong Province (CN); ASIA OPTICAL INTERNATIONAL LTD., Tortola (VG)

( * ) Notice: Subject to any disclaimer, the term of this patent is extended or adjusted under 35 U.S.C. 154(b) by 0 days.

(21) Appl. No.: 14/178,416

(22) Filed: Feb. 12, 2014

(65) Prior Publication Data
US 2014/0240847 A1 Aug. 28, 2014

(30) Foreign Application Priority Data
Feb. 26, 2013 (TW) .............................. 102106640 A

(51) Int. Cl.
*G02B 15/14* (2006.01)
*G02B 15/173* (2006.01)

(52) U.S. Cl.
CPC .............. *G02B 15/173* (2013.01); *G02B 15/14* (2013.01)

(58) Field of Classification Search
CPC ................................ G02B 15/14; G02B 15/173
See application file for complete search history.

(56) References Cited

U.S. PATENT DOCUMENTS

| 7,206,126 | B2 * | 4/2007 | Endo | 359/361 |
| 7,961,402 | B2 * | 6/2011 | Saori | 359/683 |
| 8,339,712 | B2 * | 12/2012 | Hayakawa | 359/676 |
| 8,681,431 | B2 * | 3/2014 | Sugita | 359/676 |

FOREIGN PATENT DOCUMENTS

| CN | 101546027 B | 6/2011 |
| TW | I309309 | 5/2009 |

OTHER PUBLICATIONS

Full English (machine) translation of CN101546027 (Published Jun. 1, 2011).
English Abstract translation of TWI309309 (Published May 1, 2009).

* cited by examiner

*Primary Examiner* — David N Spector
(74) *Attorney, Agent, or Firm* — McClure, Qualey & Rodack, LLP

(57) ABSTRACT

A zoom lens includes a first lens group, a second lens group, a third lens group, a fourth lens group, a fifth lens group and a sixth lens group, all of which are arranged in sequence from an object side to an image side along an optical axis. The first lens group is with positive refractive power. The second lens group is with negative refractive power. The third lens group is with positive refractive power. The fourth lens group is with negative refractive power. The fifth lens group is with positive refractive power. The zoom lens satisfies the following condition: $|f_w/f_6|<0.15$, wherein $f_w$ is an effective focal length of the zoom lens at a wide-angle end and $f_6$ is an effective focal length of the sixth lens group.

20 Claims, 24 Drawing Sheets

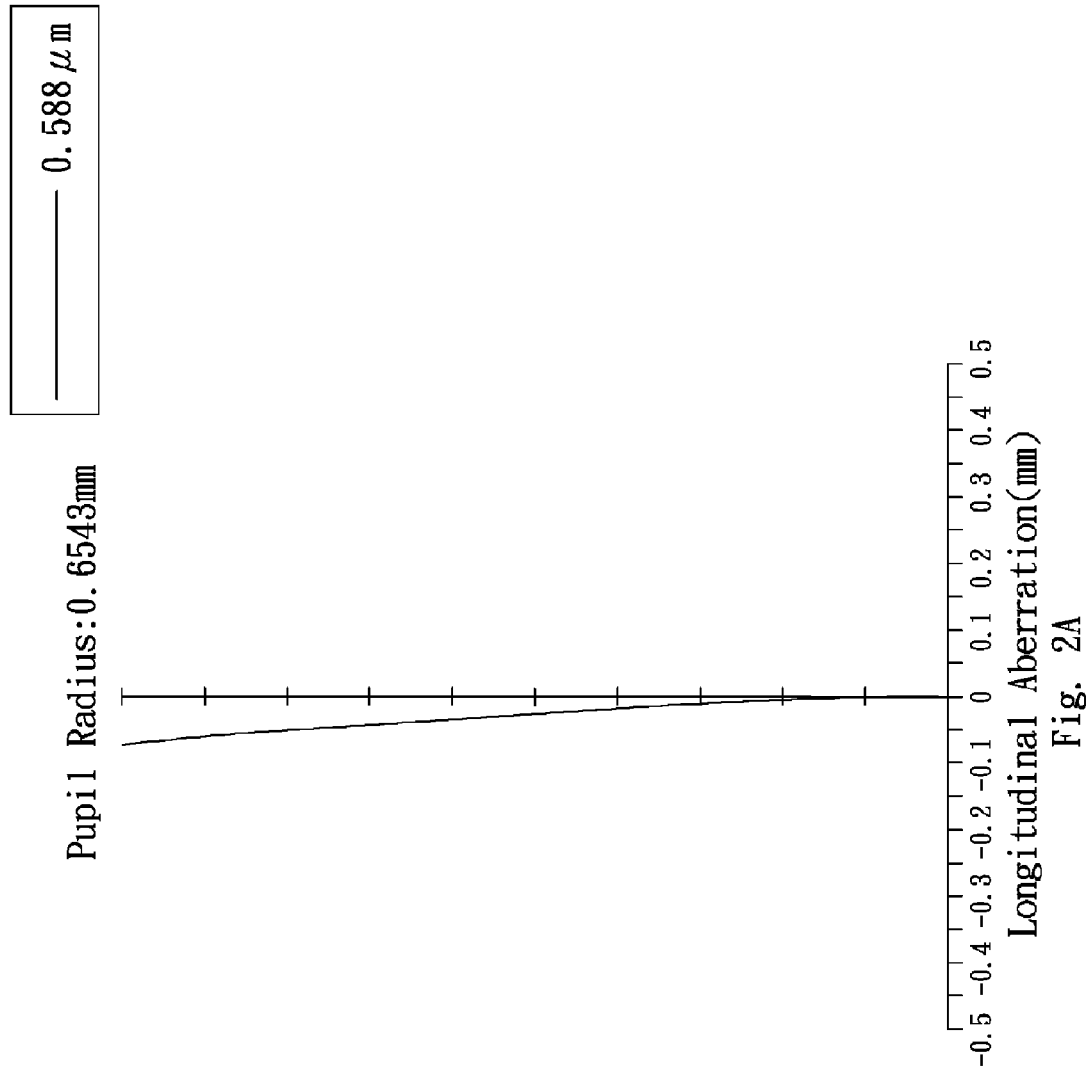

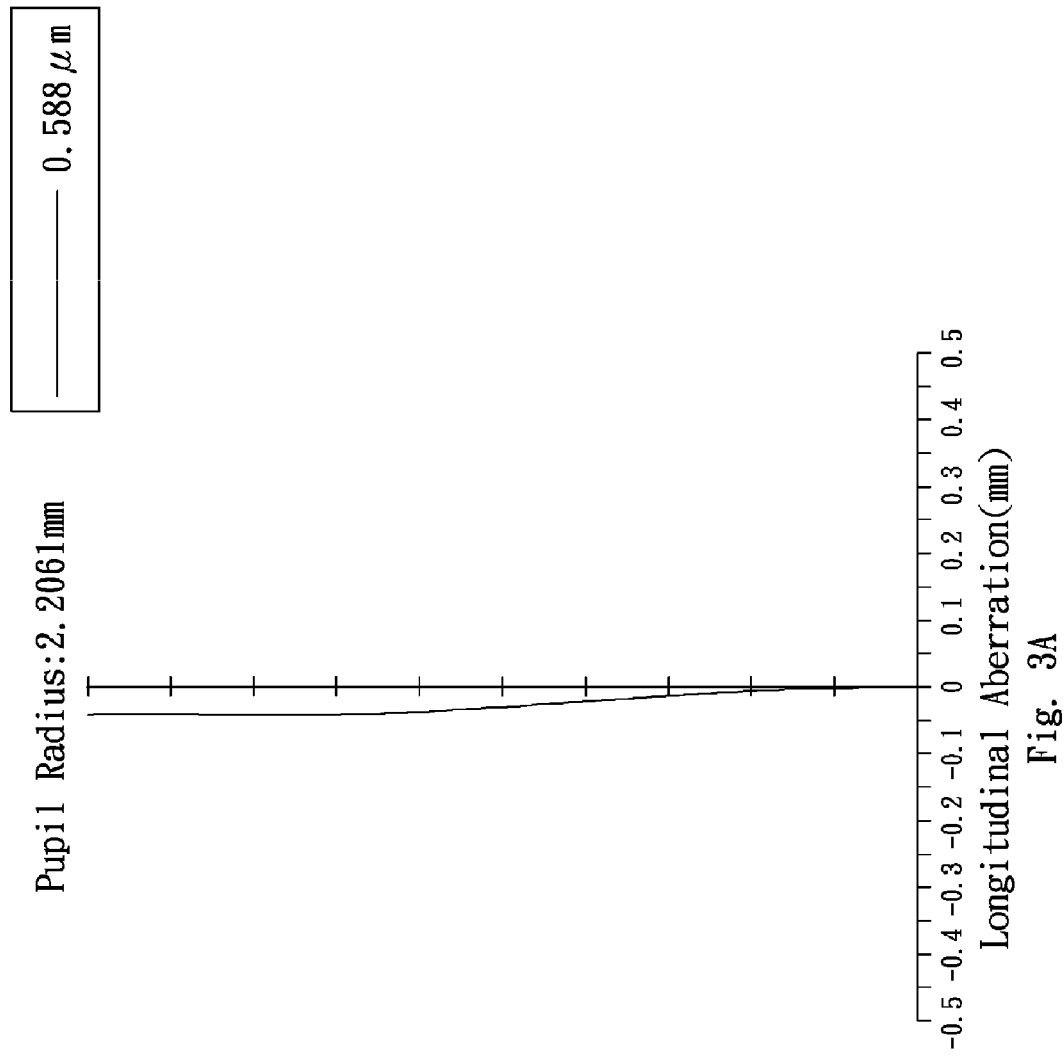

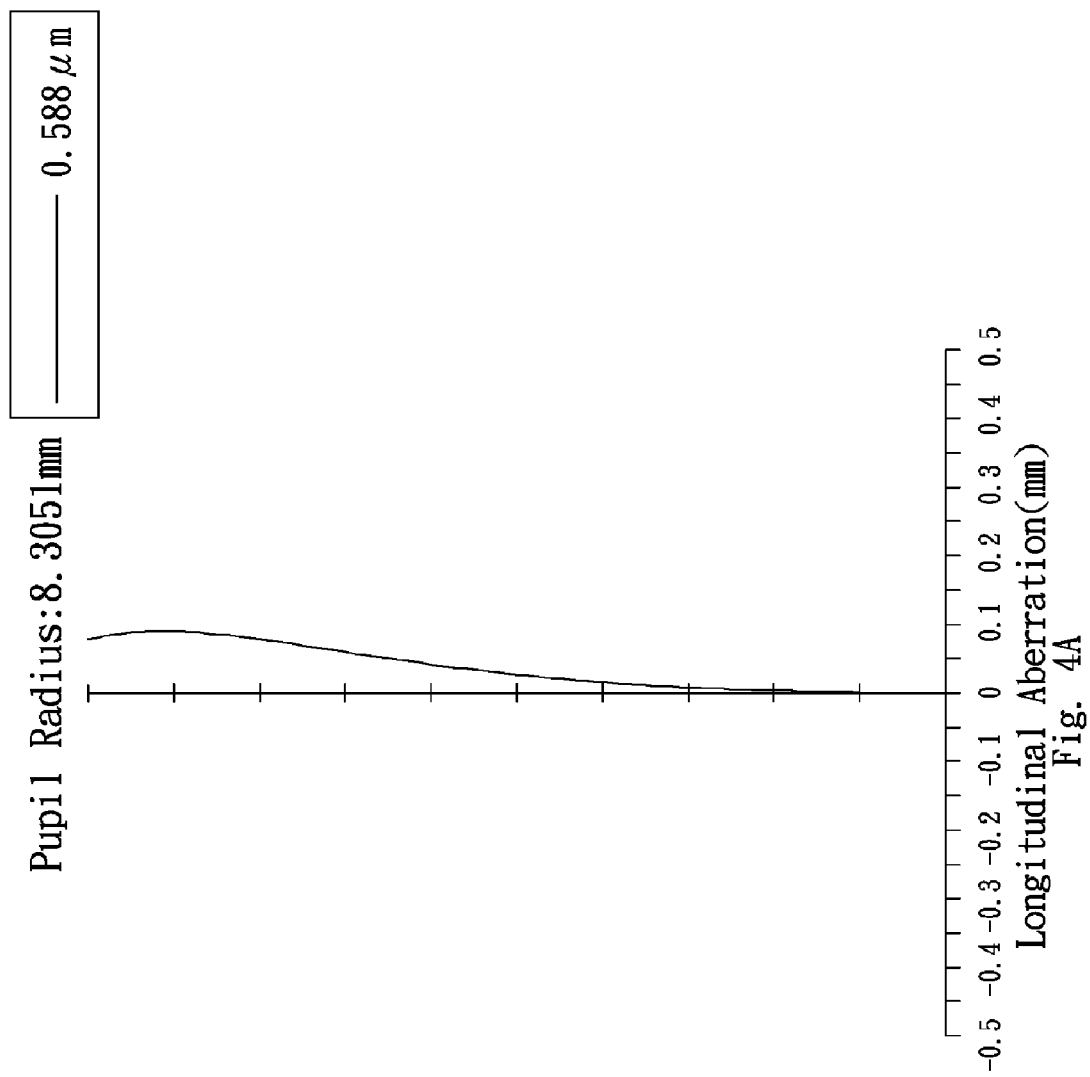

ZOOM LENS

BACKGROUND OF THE INVENTION

1. Field of the Invention

The invention relates to a lens, and more particularly to a zoom lens.

2. Description of the Related Art

In the well-known technology, for example, Japanese publication number JP 2005-345714, a zoom lens including six lens groups is disclosed, and the lens groups which are arranged in sequence from an object side to an image side are respectively with positive, negative, positive, positive, positive and positive refractive power. The effective focal length of the zoom lens is changeable when the second, the fourth and the fifth lens groups are moved. Japanese publication number JP 2008-304708 discloses a zoom lens including five lens groups and the lens groups which are arranged in sequence from an object side to an image side are respectively with positive, negative, positive, negatives and positive refractive power. Japanese publication number JP 2011-232543 discloses a zoom lens including five lens groups and the lens groups which are arranged in sequence from an object side to an image side are respectively with positive, negative, positive, negatives and positive refractive power. The effective focal length of the zoom lens is changeable when at least one of the first, the second, the third lens group is moved. The zoom ratios of the above zoom lens are all smaller than 16 times.

However, the requirement for zoom ratio of the zoom lens has been rising. A zoom lens with 16 times zoom ratio cannot meet the requirement of market. If the above three well-known technologies are used to design a zoom lens with about 24 times zoom ratio, miniaturization and good optical performance cannot be simultaneously achieved.

BRIEF SUMMARY OF THE INVENTION

The invention provides a zoom lens with about 24 times zoom ratio to solve the above problems. The zoom lens has characteristic of miniaturization and still has a good optical performance.

The zoom lens in accordance with an exemplary embodiment of the invention includes a first lens group, a second lens group, a third lens group, a fourth lens group, a fifth lens group and a sixth lens group, all of which are arranged in sequence from an object side to an image side along an optical axis. The first lens group is with positive refractive power. The second lens group is with negative refractive power. The third lens group is with positive refractive power. The fourth lens group is with negative refractive power. The fifth lens group is with positive refractive power. The zoom lens satisfies the following condition: $|f_w/f_6|<0.15$, wherein $f_w$ is an effective focal length of the zoom lens at a wide-angle end and $f_6$ is an effective focal length of the sixth lens group.

In another exemplary embodiment, an interval between the first lens group and the second lens group increases, an interval between the second lens group and the third lens group decreases, an interval between the third lens group and the fourth lens group increases and then decreases, and the sixth lens group is stationary, when the zoom lens zooms from the wide-angle end to a telephoto end.

In yet another exemplary embodiment, the first lens group includes a first lens, a second lens and a third lens, all of which are arranged in sequence from the object side to the image side along the optical axis, the second lens group includes a fourth lens, a fifth lens and a sixth lens, all of which are arranged in sequence from the object side to the image side along the optical axis.

In another exemplary embodiment, the third lens group includes a seventh lens, an eighth lens and a ninth lens, all of which are arranged in sequence from the object side to the image side along the optical axis, wherein the eighth lens and the ninth lens are cemented, the seventh lens is with positive refractive power, the eighth lens is with negative refractive power and the ninth lens is with positive refractive power.

In yet another exemplary embodiment, the seventh lens satisfies the following conditions: $Nd_7<1.565$, $40<Vd_7<65$ wherein $Nd_7$ is a refractive index of the seventh lens and $Vd_7$ is an Abbe number of the seventh lens.

In another exemplary embodiment, the eighth lens and the ninth lens satisfy the following condition: $Vd_9-Vd_8>35$ wherein $Vd_8$ is an Abbe number of the eighth lens and $Vd_9$ is an Abbe number of the ninth lens.

In yet another exemplary embodiment, the fourth lens group includes a tenth lens, the tenth lens is with negative refractive power and includes a concave surface facing the image side.

In another exemplary embodiment, the fifth lens group includes an eleventh lens, the sixth lens group includes a twelfth lens and the eleventh lens and the twelfth lens are made of plastic material.

In yet another exemplary embodiment, the zoom lens further includes a stop disposed between the second lens group and the third lens group.

In another exemplary embodiment, an interval between the stop and the third lens group is stationary.

In yet another exemplary embodiment, the zoom lens further includes an optical filter disposed between the sixth lens group and an image plane.

The zoom lens in accordance with an exemplary embodiment of the invention includes a first lens group, a second lens group, a third lens group, a fourth lens group, a fifth lens group and a sixth lens group, all of which are arranged in sequence from an object side to an image side along an optical axis. The first lens group is with positive refractive power. The second lens group is with negative refractive power. The third lens group is with positive refractive power. The fourth lens group is with negative refractive power. The fifth lens group is with positive refractive power. An interval between the first lens group and the second lens group increases, an interval between the second lens group and the third lens group decreases, an interval between the third lens group and the fourth lens group increases and then decreases, and the sixth lens group is stationary, when the zoom lens zooms from a wide-angle end to a telephoto end.

In another exemplary embodiment, the zoom lens satisfies the following condition: $|f_w/f_6|<0.15$, wherein $f_w$ is an effective focal length of the zoom lens at the wide-angle end and $f_6$ is an effective focal length of the sixth lens group.

In yet another exemplary embodiment, the third lens group includes a seventh lens, an eighth lens and a ninth lens, all of which are arranged in sequence from the object side to the image side along the optical axis, wherein the eighth lens and the ninth lens are cemented, the seventh lens is with positive refractive power, the eighth lens is with negative refractive power and the ninth lens is with positive refractive power.

In another exemplary embodiment, the seventh lens satisfies the following conditions: $Nd_7<1.565$, $40<Vd_7<65$ wherein $Nd_7$ is a refractive index of the seventh lens and $Vd_7$ is an Abbe number of the seventh lens.

In yet another exemplary embodiment, the eighth lens and the ninth lens satisfy the following condition: $Vd_9-Vd_8>35$ wherein $Vd_8$ is an Abbe number of the eighth lens and $Vd_9$ is an Abbe number of the ninth lens.

In another exemplary embodiment, the fourth lens group includes a tenth lens, the tenth lens is with negative refractive power and includes a concave surface facing the image side.

In yet another exemplary embodiment, the fifth lens group includes an eleventh lens, the sixth lens group includes a twelfth lens, and the eleventh lens and the twelfth lens are made of plastic material.

In another exemplary embodiment, the zoom lens further includes a stop disposed between the second lens group and the third lens group.

In yet another exemplary embodiment, an interval between the stop and the third lens group is stationary.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein:

FIG. 2A is a longitudinal aberration diagram of the zoom lens at the wide-angle end in accordance with the first embodiment of the invention;

FIG. 3A is a longitudinal aberration diagram of the zoom lens at a medium end in accordance with the first embodiment of the invention;

FIG. 4A is a longitudinal aberration diagram of the zoom lens at a telephoto end in accordance with the first embodiment of the invention;

DETAILED DESCRIPTION OF THE INVENTION

The following description is made for the purpose of illustrating the general principles of the invention and should not be taken in a limiting sense. The scope of the invention is best determined by reference to the appended claims.

Figure 1:
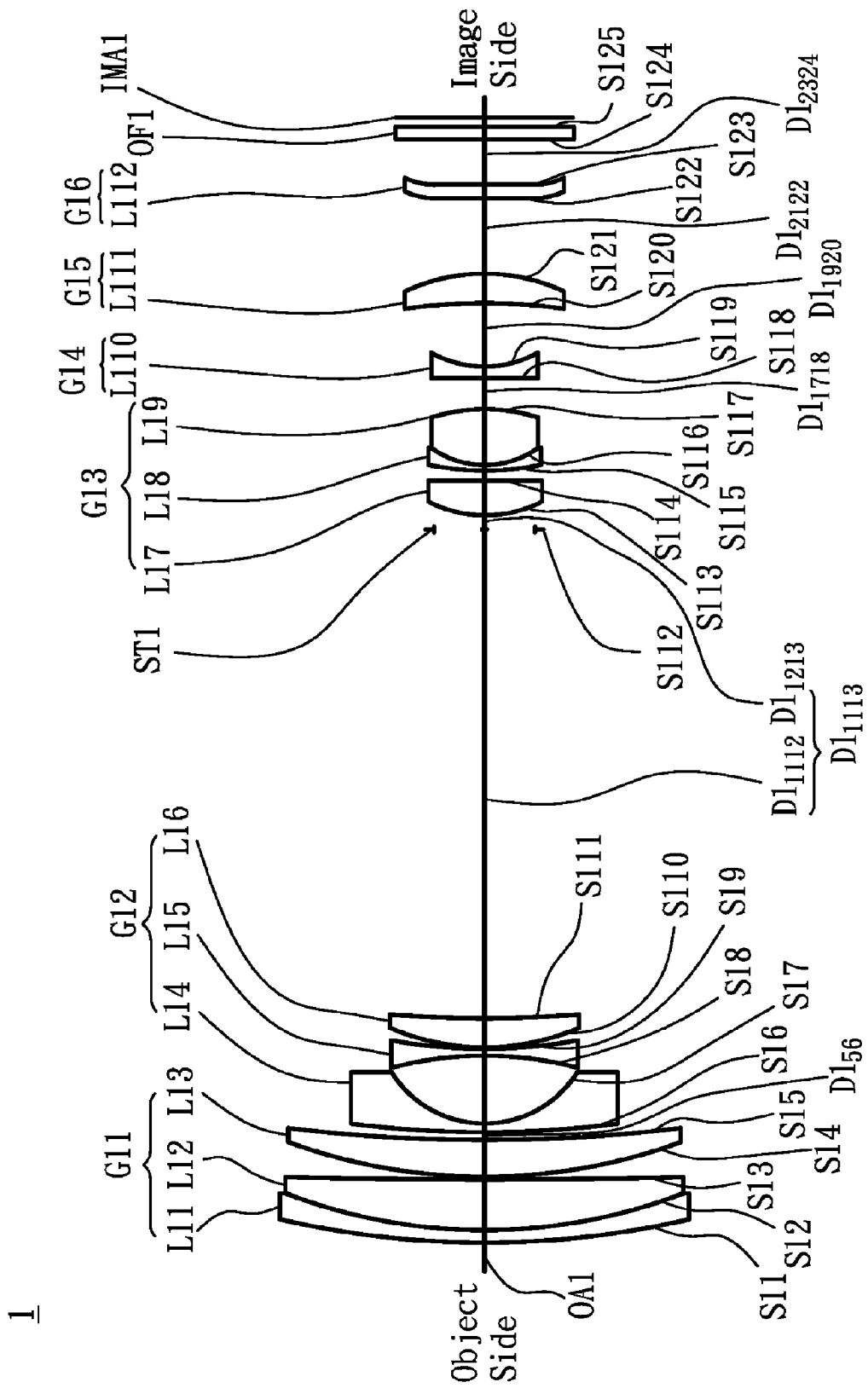
FIG. 1 is a lens layout diagram of a zoom lens at a wide-angle end in accordance with a first embodiment of the invention.

Referring to FIG. 1, FIG. 1 is a lens layout diagram of a zoom lens at a wide-angle end in accordance with a first embodiment of the invention. The zoom lens 1 includes a first lens group G11, a second lens group G12, a stop ST1, a third lens group G13, a fourth lens group G14, a fifth lens group G15, a sixth lens group G16 and an optical filter OF1, all of which are arranged in sequence from an object side to an image side along an optical axis OA1. An interval $D1_{56}$ between the first lens group G11 and the second lens group G12 increases, an interval $D1_{1113}$ between the second lens group G12 and the third lens group G13 decreases, an interval $D1_{1718}$ between the third lens group G13 and the fourth lens group G14 increases and then decreases, and the sixth lens group G16 is stationary, when the zoom lens 1 zooms from the wide-angle end to a telephoto end.

In the present embodiment, the first lens group G11 is with positive refractive power, the second lens group G12 is with negative refractive power, the third lens group G13 is with positive refractive power, the fourth lens group G14 is with negative refractive power, the fifth lens group G15 is with positive refractive power and the sixth lens group G16 is with negative refractive power.

The first lens group G11 includes a first lens L11, a second lens L12 and a third lens L13, all of which are arranged in sequence from the object side to the image side along the optical axis OA1. The image side surface S12 of the first lens L11 and the object side surface S12 of the second lens L12 are cemented.

The second lens group G12 includes a fourth lens L14, a fifth lens L15 and a sixth lens L16, all of which are arranged in sequence from the object side to the image side along the optical axis OA1.

The third lens group G13 includes a seventh lens L17, an eighth lens L18 and a ninth lens L19, all of which are arranged in sequence from the object side to the image side along the optical axis OA1. The seventh lens L17 is with positive refractive power. The eighth lens L18 is with negative refractive power. The ninth lens L19 is with positive refractive power. The image side surface S116 of the eighth lens L18 and the object side surface S116 of the ninth lens L19 are cemented.

The fourth lens group G14 includes a tenth lens L110. The tenth lens L110 is with negative refractive power and made of plastic material. The image side surface 5119 of the tenth lens L110 is a concave surface.

The fifth lens group G15 includes an eleventh lens L111. The eleventh lens L111 is made of plastic material.

The sixth lens group G16 includes a twelfth lens L112. The twelfth lens L112 is made of plastic material.

An interval $D1_{1213}$ between the stop ST1 and the third lens group G13 is stationary. The optical filter OF1 is a glass plate and includes an object side surface S124 and an image side surface S125. Both of the object side surface S124 and the image side surface S125 are plane surfaces.

In order to maintain good optical performance of the zoom lens 1 in accordance with the present embodiment, the zoom lens 1 must satisfies the following four conditions:

$$|f_{1w}/f_{16}|<0.15 \quad (1)$$

$$Nd_{17}<1.565 \quad (2)$$

$$40<Vd_{17}<65 \quad (3)$$

$$Vd_{19}-Vd_{18}>35 \quad (4)$$

wherein $f_{1w}$ is an effective focal length of the zoom lens 1 at the wide-angle end, $f_{16}$ is an effective focal length of the sixth lens group G16, $Nd_{17}$ is a refractive index of the seventh lens L17, $Vd_{17}$ is an Abbe number of the seventh lens L17, $Vd_{18}$ is an Abbe number of the eighth lens L18 and $Vd_{19}$ is an Abbe number of the ninth lens L19.

Due to the above design of the lenses and stop ST1, the zoom lens 1 at a high zoom ratio is miniature and provided with a good optical performance. The zoom lens 1 at the wide-angle end also has a larger field of view.

In order to achieve the above purpose and effectively enhance the optical performance, the zoom lens 1 at the wide-angle end, a medium end (not shown) and the telephoto end (not shown) of the present embodiment of the invention is provided with the optical specifications shown in Table 1, which include an effective focal length, a radius of curvature of each lens surface, a thickness between adjacent surface, a refractive index of each lens and an Abbe number of each lens. Table 1 shows that the effective focal length, F-number, total lens length and field of view of the zoom lens 1 at the wide-angle end is equal to 4.43 mm, 3.37, 63.35 mm and 83.68 degrees, the effective focal length, F-number, total lens length and field of view of the zoom lens 1 at the medium end is equal to 21.49 mm, 5.31, 67.36 mm and 20.10 degrees, the effective focal length, F-number, total lens length and field of view of the zoom lens 1 at the telephoto end is equal to 104.27 mm, 6.28, 84.89 mm and 4.26 degrees, and the zoom ratio of the zoom lens 1 is about 23.54.

TABLE 1

| | Effective Focal Length (mm) | F-number | Total Lens Length (mm) | Field of View (Degrees) |
|---|---|---|---|---|
| W (Wide-angle End) | 4.43 | 3.37 | 63.35 | 83.68 |
| M (Medium End) | 21.49 | 5.31 | 67.36 | 20.10 |
| T (Telephoto End) | 104.27 | 6.28 | 84.89 | 4.26 |

| Surface Number | Radius of Curvature (mm) | Thickness (mm) | Nd | Vd | Remark |
|---|---|---|---|---|---|
| S11 | 50.507 | 0.70 | 2.00069 | 25.5 | The First Lens Group G11 The First Lens L11 |
| S12 | 30.939 | 2.90 | 1.49700 | 81.6 | The First Lens Group G11 The Second Lens L12 |
| S13 | 396.434 | 0.1 | | | |
| S14 | 31.448 | 2.20 | 1.77250 | 49.6 | The First Lens Group G11 The Third Lens L13 Interval $D1_{56}$ |
| S15 | 104.772 | 0.33(W) 15.27(M) 34.49(T) | | | |
| S16 | 55.297 | 0.50 | 1.77250 | 49.6 | The Second Lens Group G12 The Fourth Lens L14 |
| S17 | 6.235 | 3.78 | | | |
| S18 | −20.052 | 0.40 | 1.81600 | 46.6 | The Second Lens Group G12 The Fifth Lens L15 |
| S19 | 26.712 | 0.1 | | | |
| S110 | 13.383 | 1.60 | 1.95906 | 1.75 | The Second Lens Group G12 The Sixth Lens L16 Interval $D1_{1112}$ |
| S111 | 46.285 | 27.56(W) 7.30(M) 1.20(T) | | | |
| S112 | ∞ | 0.8 | | | Stop ST1 |
| S113 | 6.566 | 2.00 | 1.56455 | 60.8 | The Third Lens Group G13 The Seventh Lens L17 |
| S114 | −46.569 | 0.5 | | | |
| S115 | 16.413 | 0.35 | 1.88300 | 40.8 | The Third Lens Group G13 The Eighth Lens L18 |
| S116 | 5.262 | 3.15 | 1.43700 | 95.0 | The Third Lens Group G13 The Ninth Lens L19 Interval $D1_{1718}$ |
| S117 | −9.156 | 1.71(W) 5.04(M) 4.28(T) | | | |

TABLE 1-continued

| | | | | | |
|---|---|---|---|---|---|
| S118 | −139.662 | 0.70 | 1.53113 | 55.8 | The Fourth Lens Group G14 The Tenth Lens L110 |
| S119 | 6.707 | 3.50(W) 10.18(M) 16.58(T) | | | Interval $D1_{1920}$ |
| S120 | −33.159 | 1.70 | 1.53113 | 55.8 | The Fifth Lens Group G15 The Eleventh Lens L111 |
| S121 | −9.395 | 4.25(W) 3.57(M) 2.34(T) | | | Interval $D1_{2122}$ |
| S122 | −39.152 | 0.70 | 1.63558 | 23.9 | The Sixth Lens Group G16 The Twelfth Lens L112 |
| S123 | −53.691 | 2.60 | | | Interval $D1_{2324}$ |
| S124 | ∞ | 0.72 | 1.51633 | 64.1 | Optical Filter OF1 |
| S125 | ∞ | 0.50 | | | |

The aspheric surface sag z of each lens in table 1 can be calculated by the following formula:

$$Z=ch^2/\{1+[1-(k+1)c^2h^2]^{1/2}\}+Ah^4+Bh^6+Ch^8$$

where c is a curvature, h is a vertical distance from the lens surface to the optical axis, k is a conic constant and A, B and C are aspheric coefficients.

In the present embodiment, the conic constant k and the aspheric coefficients A, B, C of each surface are shown in Table 2.

TABLE 2

| Surface Number | k | A | B | C |
|---|---|---|---|---|
| S113 | 0 | −1.8332e−04 | −1.8606e−06 | 0 |
| S114 | 0 | 5.5146e−04 | −1.5570e−06 | 0 |
| S121 | 0 | 3.2462e−04 | −2.4083e−06 | 0 |
| S122 | 0 | 1.2079e−03 | 1.7187e−05 | 0 |
| S123 | 0 | 8.1975e−04 | 3.3395e−05 | 1.3379e−07 |

For the zoom lens 1 of the present embodiment, the effective focal length $f_{1w}$ of the zoom lens 1 at the wide-angle end is equal to 4.43 mm, the effective focal length $f_{16}$ of the sixth lens group G16 is equal to −231.82 mm, the refractive index $Nd_{17}$ of the seventh lens L17 is equal to 1.56455, the Abbe number $Vd_{17}$ of the seventh lens L17 is equal to 60.8, the Abbe number $Vd_{18}$ of the eighth lens L18 is equal to 40.8, and the Abbe number $Vd_{19}$ of the ninth lens L19 is equal to 95.0. According to the above data, the following values can be obtained:

$$|f_{1w}/f_{16}|=0.0191,$$

$$Vd_{19}-Vd_{18}=54.2.$$

It is found that the above data and the obtained values satisfy the conditions (1)-(4).

Figure 2B:
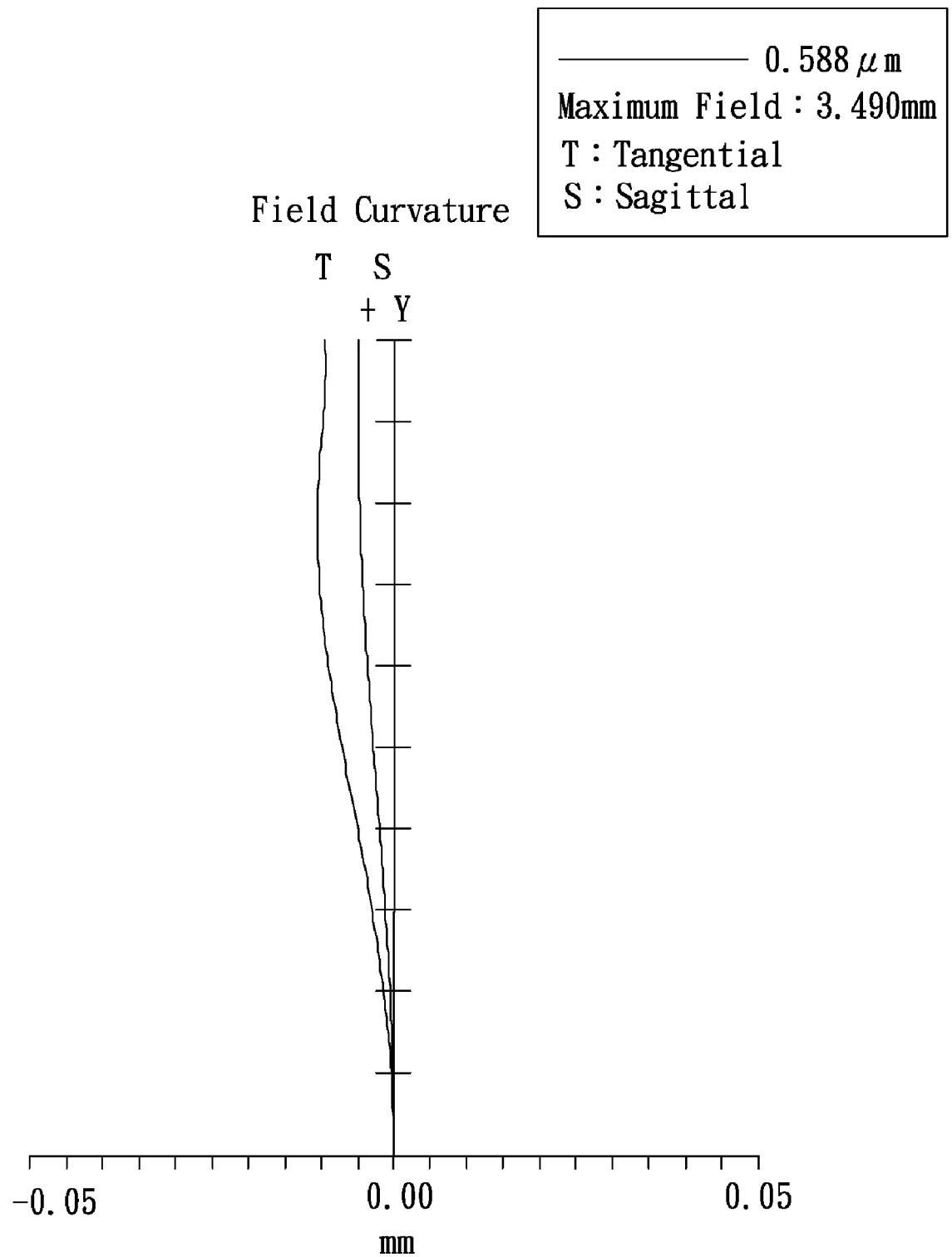
FIG. 2B is a field curvature diagram of the zoom lens at the wide-angle end in accordance with the first embodiment of the invention.
Figure 2C:
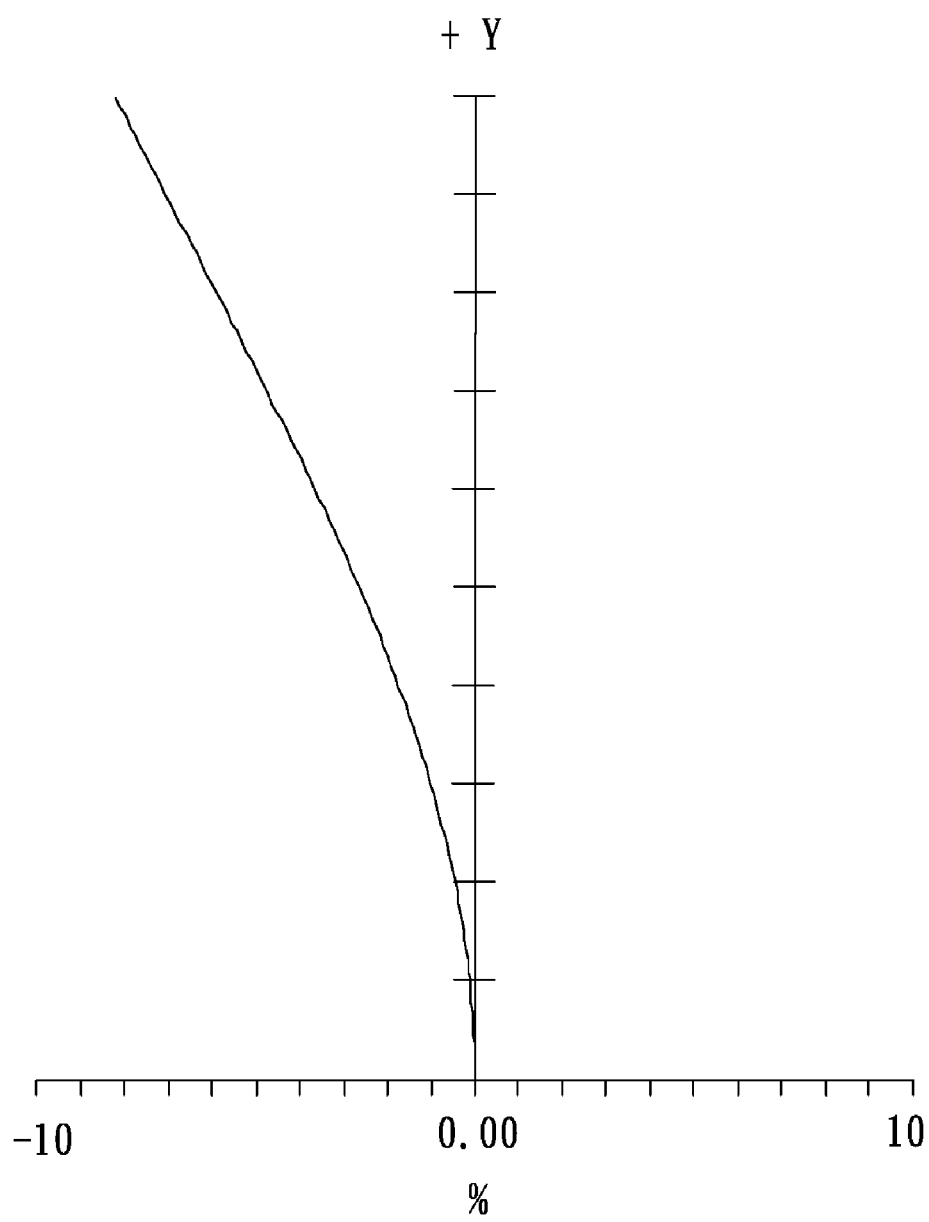
FIG. 2C is a distortion diagram of the zoom lens at the wide-angle end in accordance with the first embodiment of the invention.
Figure 2D:
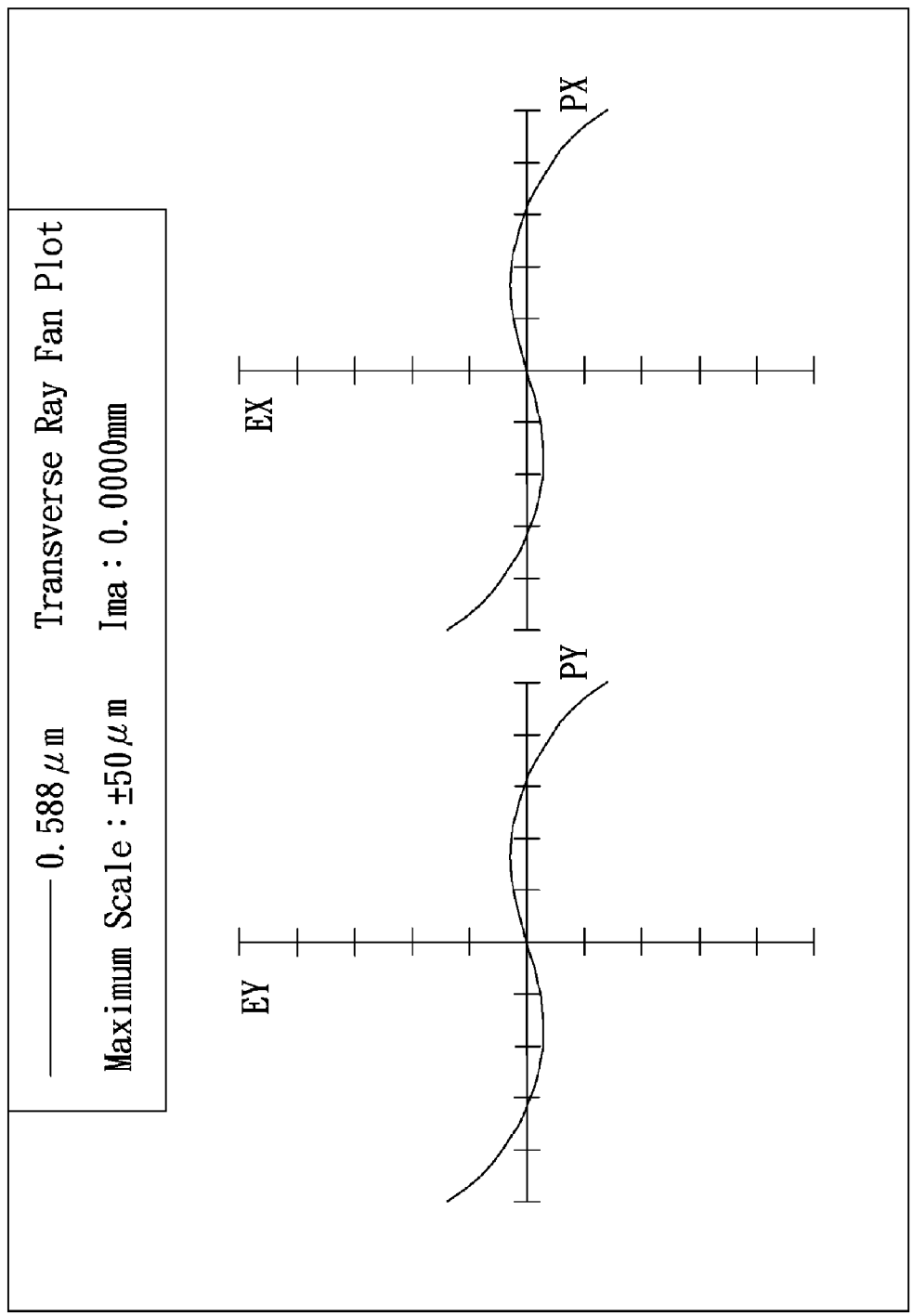
FIG. 2D is a transverse ray fan diagram of the zoom lens at the wide-angle end in accordance with the first embodiment of the invention.
Figure 2E:
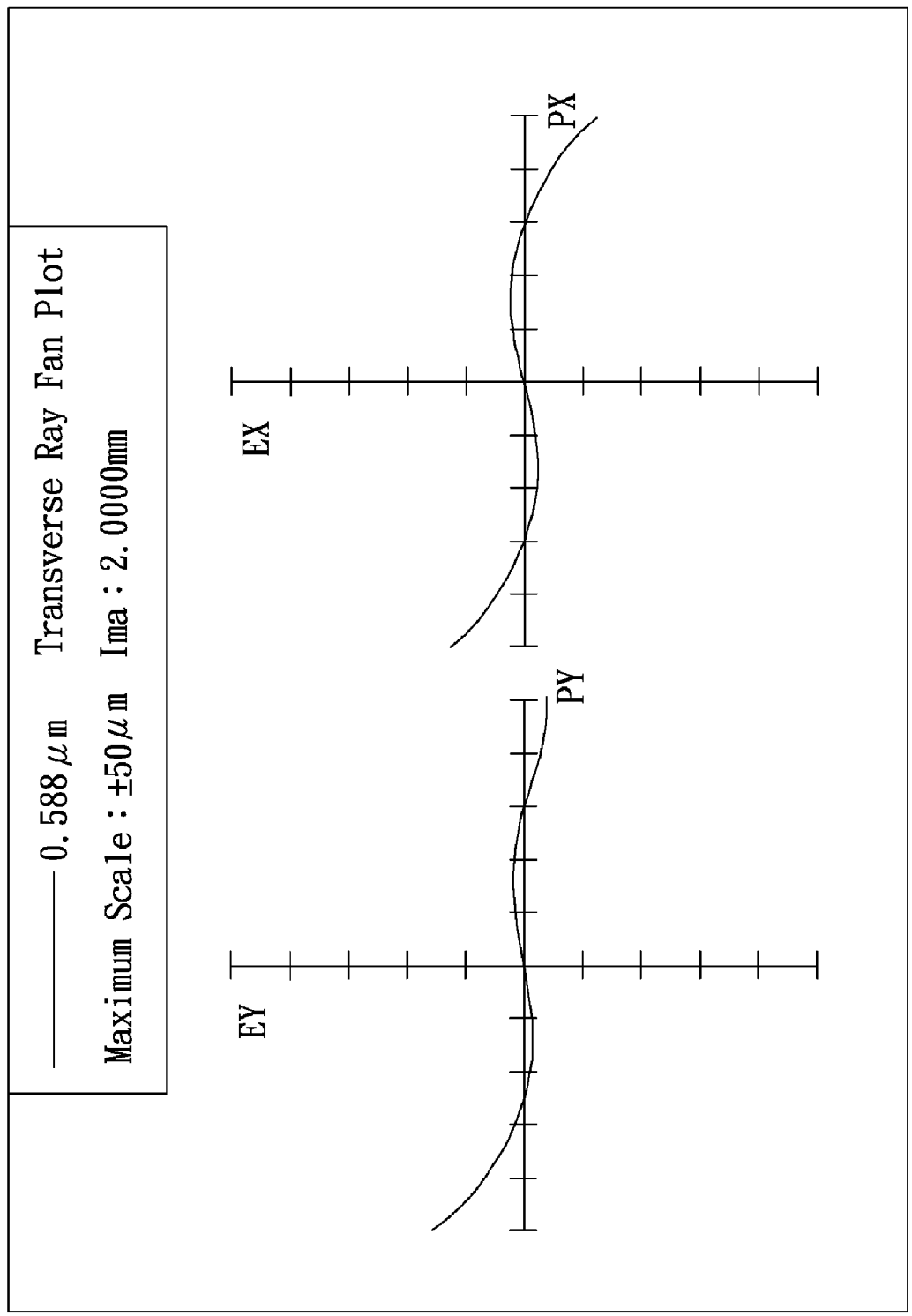
FIG. 2E is a transverse ray fan diagram of the zoom lens at the wide-angle end in accordance with the first embodiment of the invention.
Figure 2F:
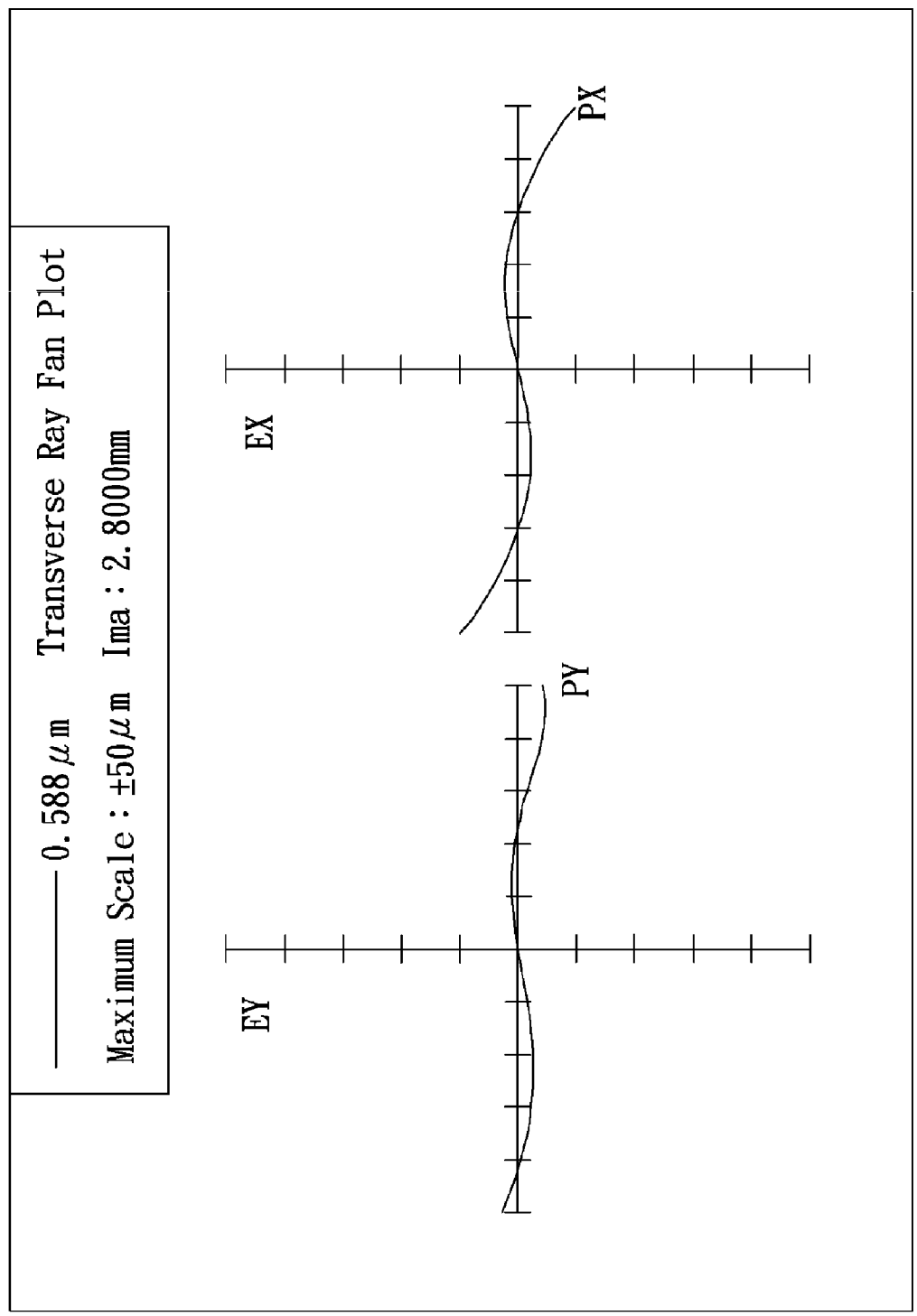
FIG. 2F is a transverse ray fan diagram of the zoom lens at the wide-angle end in accordance with the first embodiment of the invention.
Figure 2G:
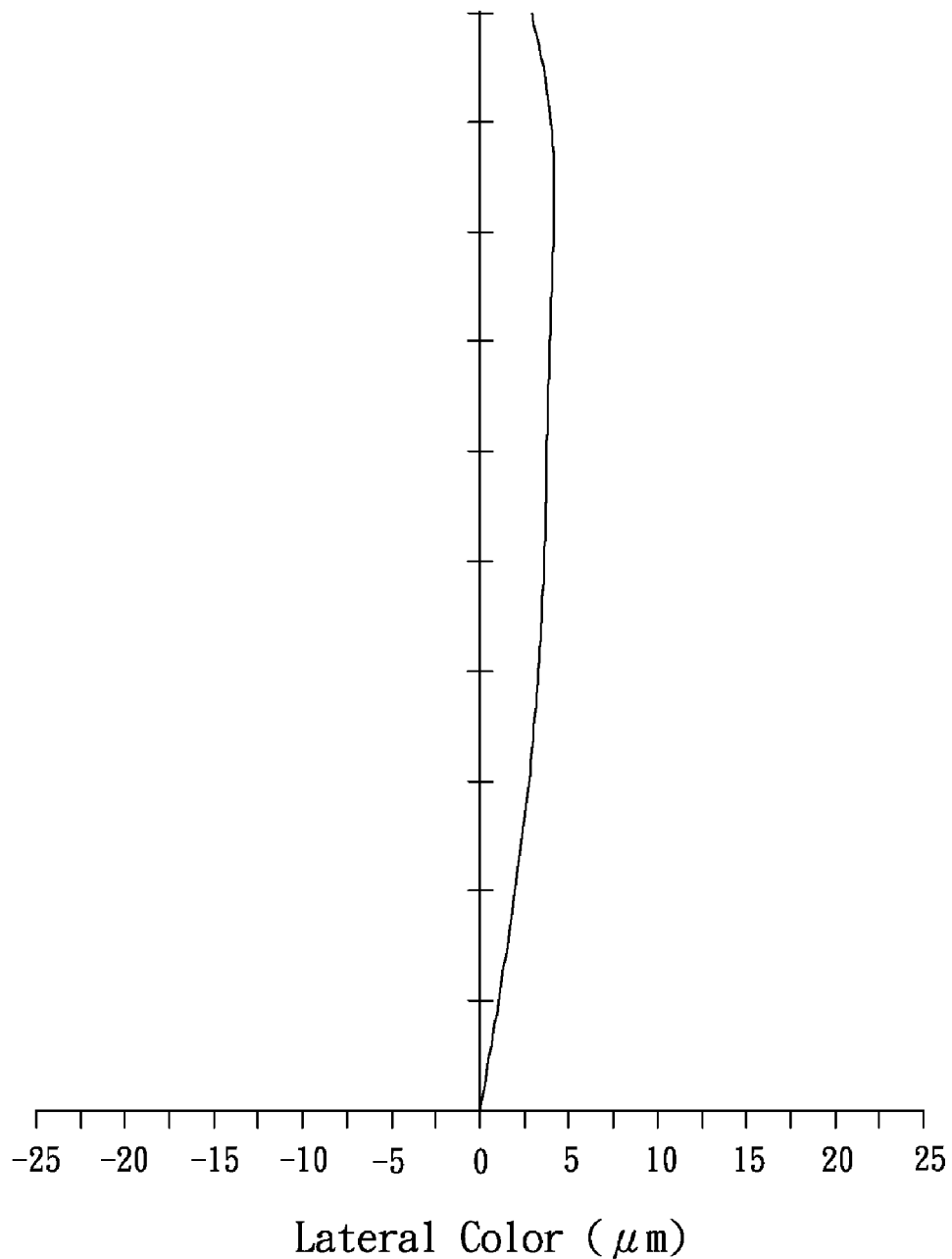
FIG. 2G is a lateral color diagram of the zoom lens at the wide-angle end in accordance with the first embodiment of the invention.
Figure 3B:
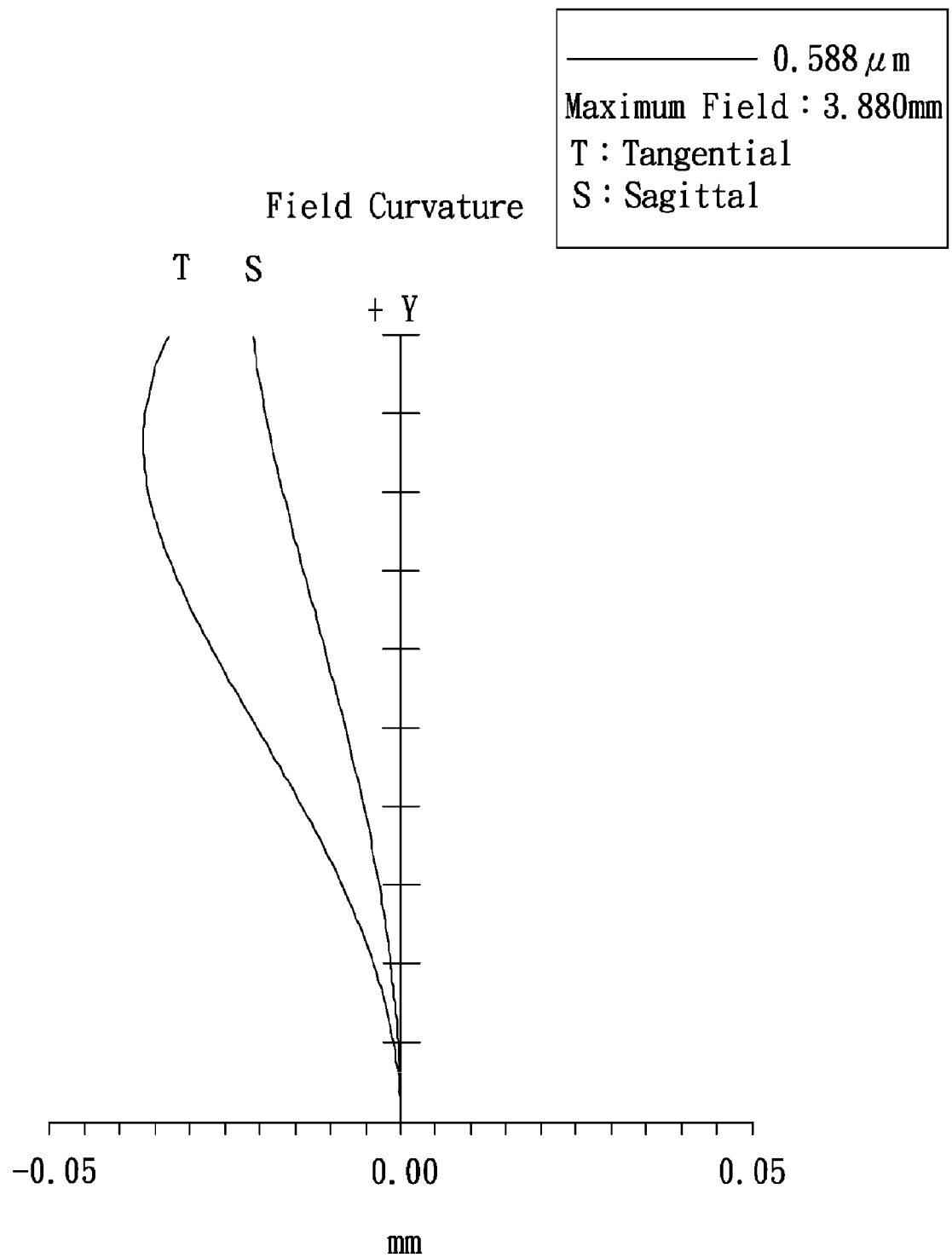
FIG. 3B is a field curvature diagram of the zoom lens at the medium end in accordance with the first embodiment of the invention.
Figure 3C:
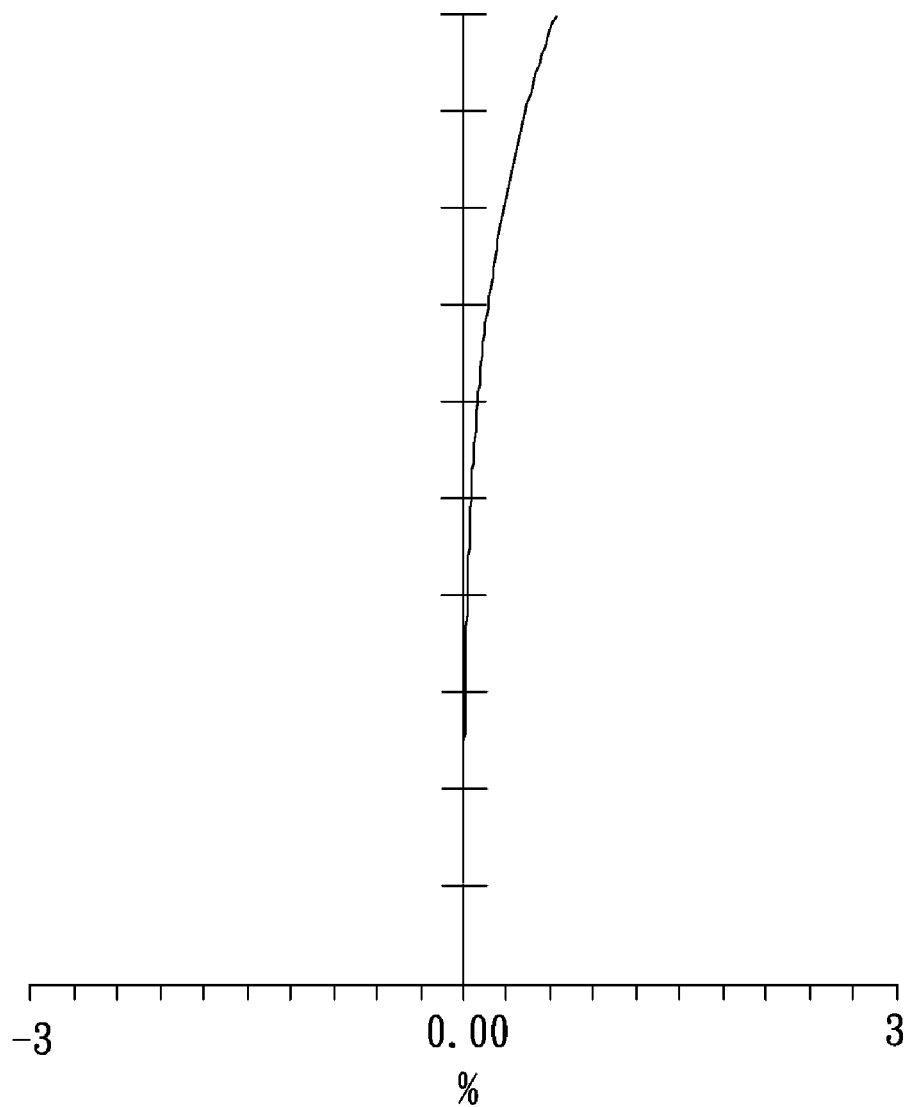
FIG. 3C is a distortion diagram of the zoom lens at the medium end in accordance with the first embodiment of the invention.
Figure 3D:
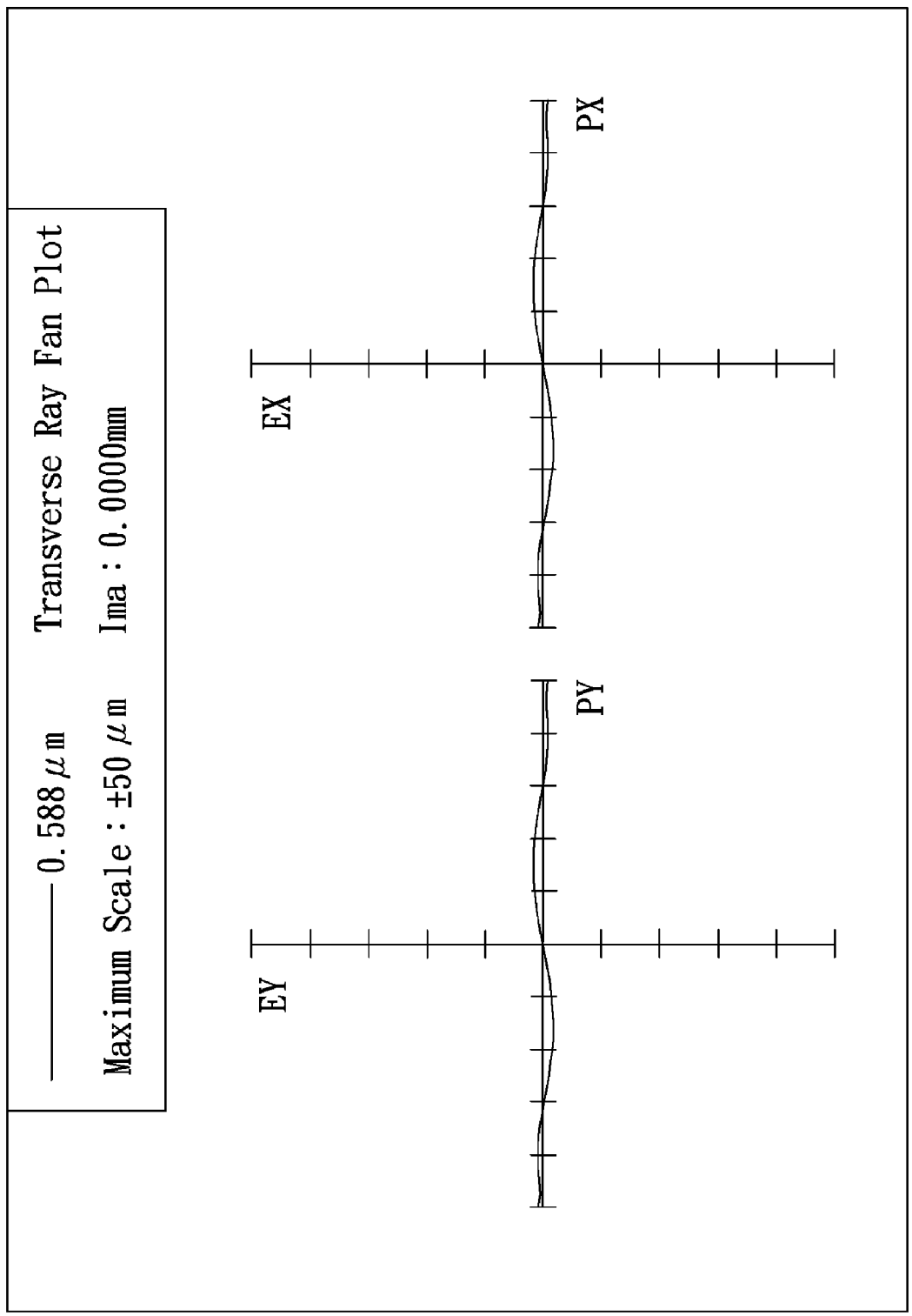
FIG. 3D is a transverse ray fan diagram of the zoom lens at the medium end in accordance with the first embodiment of the invention.
Figure 3E:
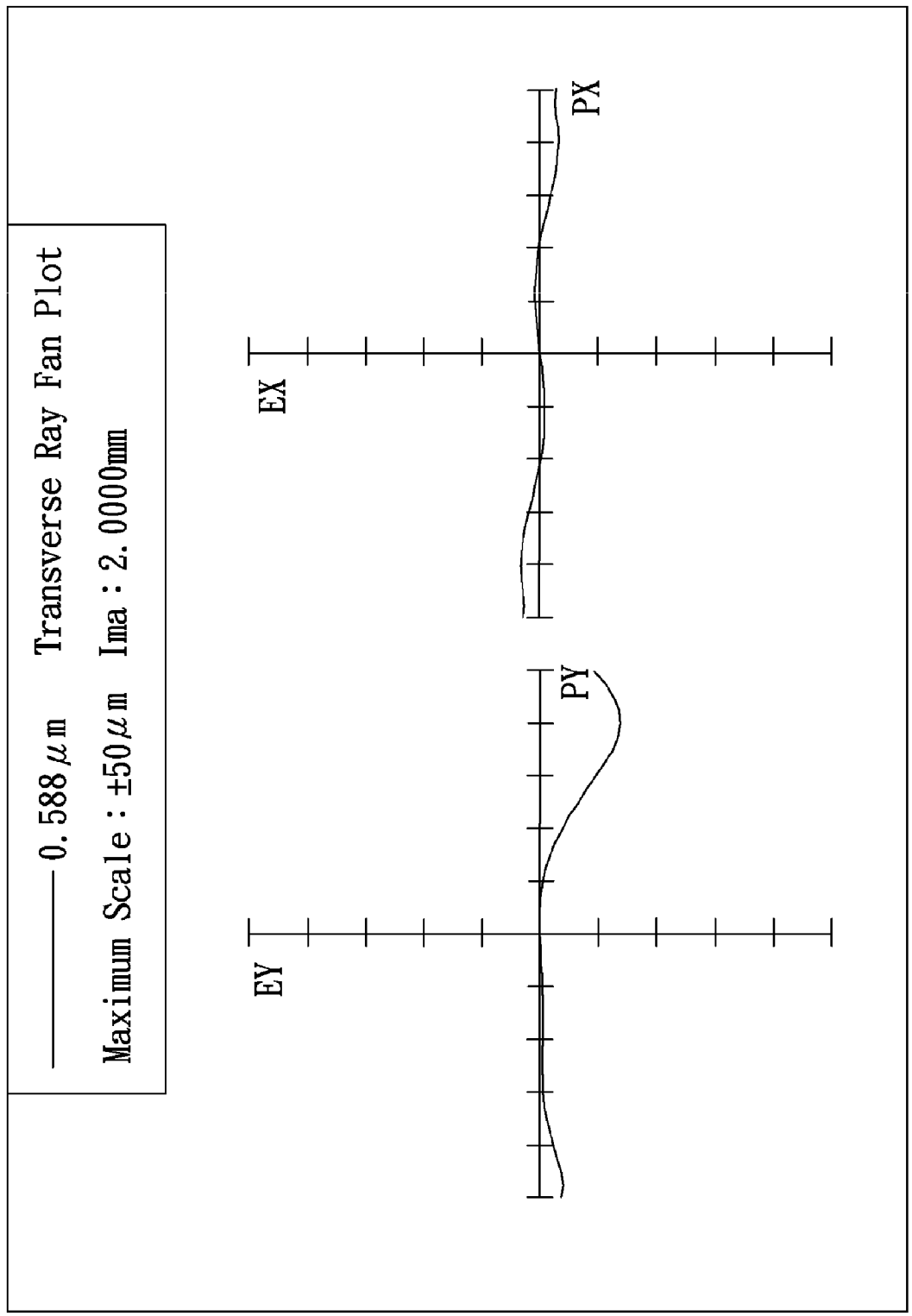
FIG. 3E is a transverse ray fan diagram of the zoom lens at the medium end in accordance with the first embodiment of the invention.
Figure 3F:
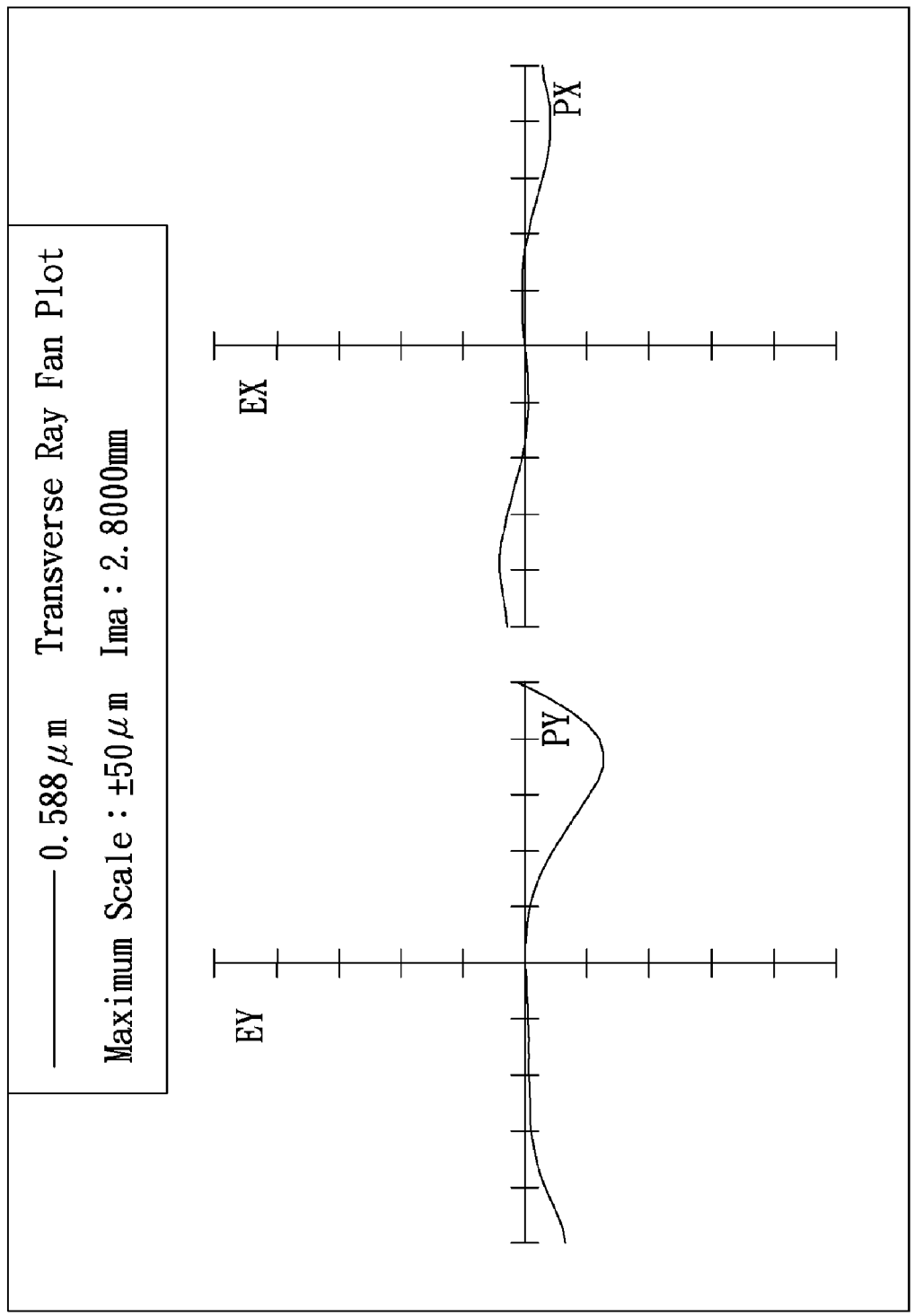
FIG. 3F is a transverse ray fan diagram of the zoom lens at the medium end in accordance with the first embodiment of the invention.
Figure 3G:
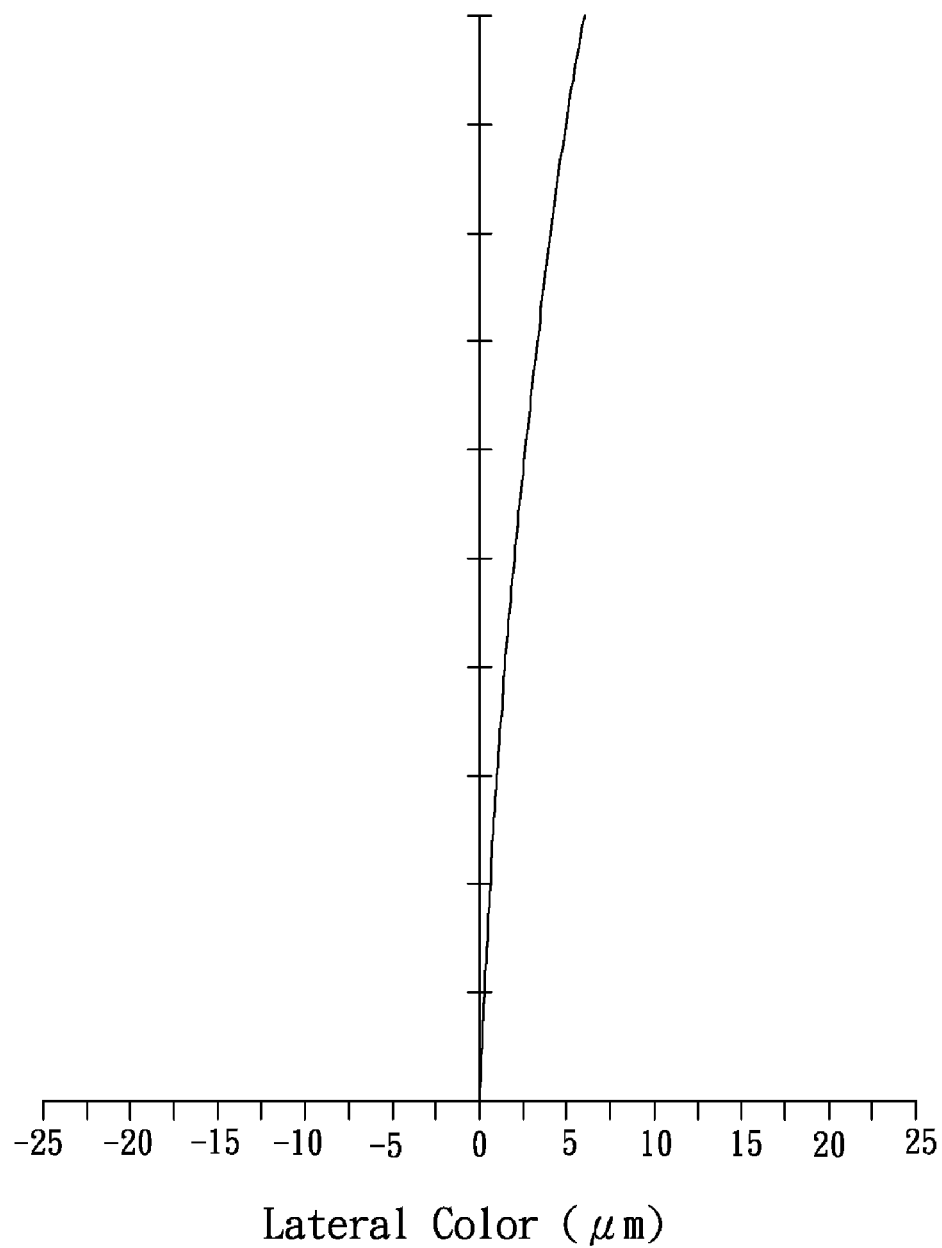
FIG. 3G is a lateral color diagram of the zoom lens at the medium end in accordance with the first embodiment of the invention.
Figure 4B:
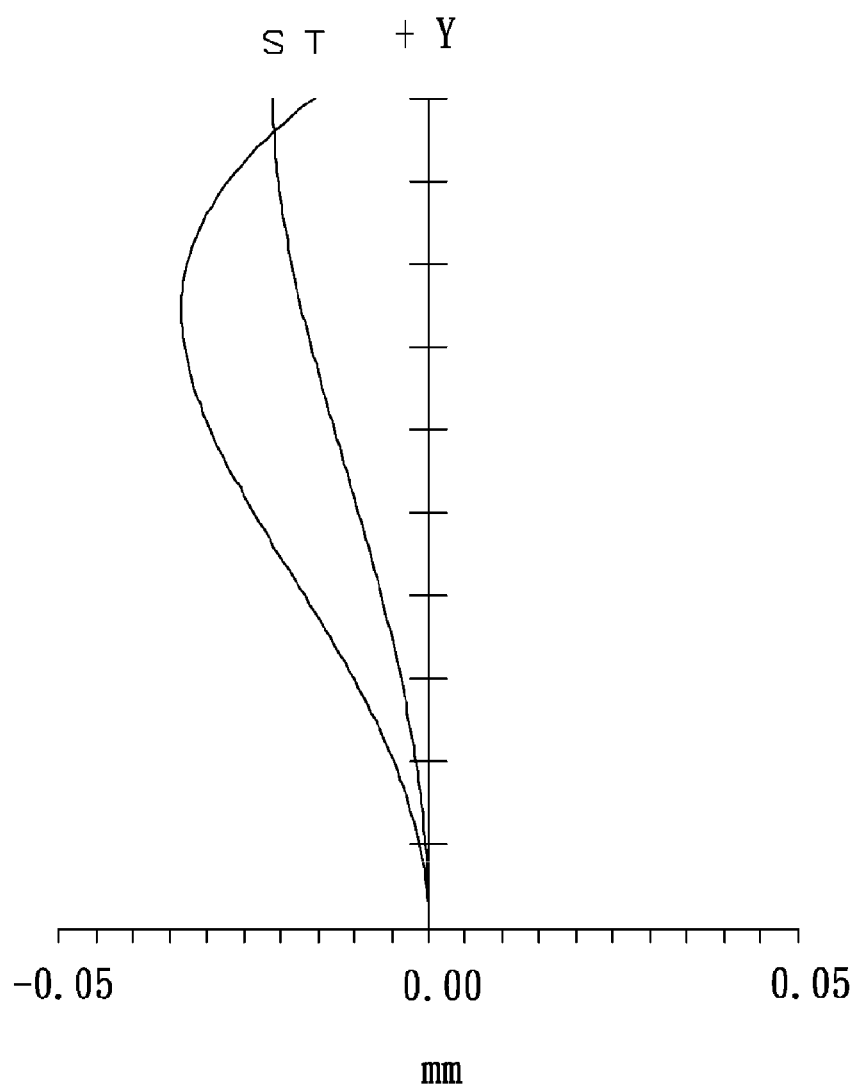
FIG. 4B is a field curvature diagram of the zoom lens at the telephoto end in accordance with the first embodiment of the invention.
Figure 4C:
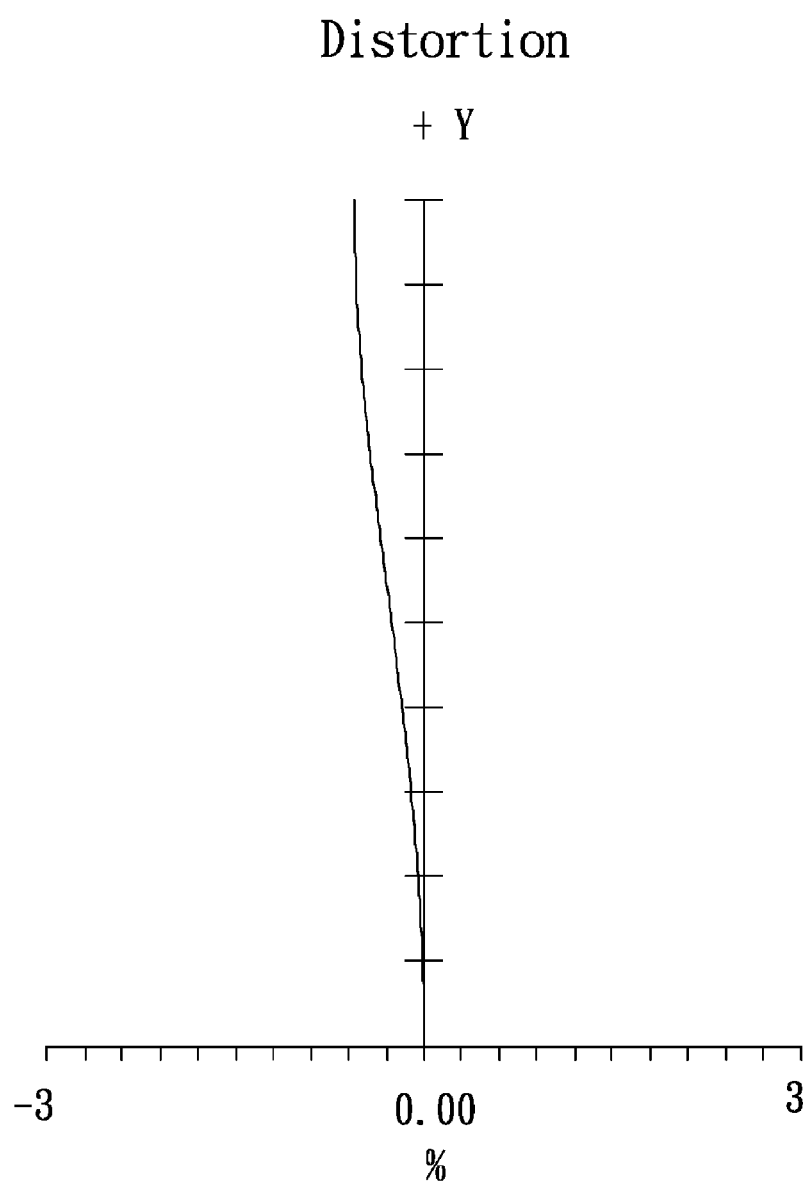
FIG. 4C is a distortion diagram of the zoom lens at the telephoto end in accordance with the first embodiment of the invention.
Figure 4D:
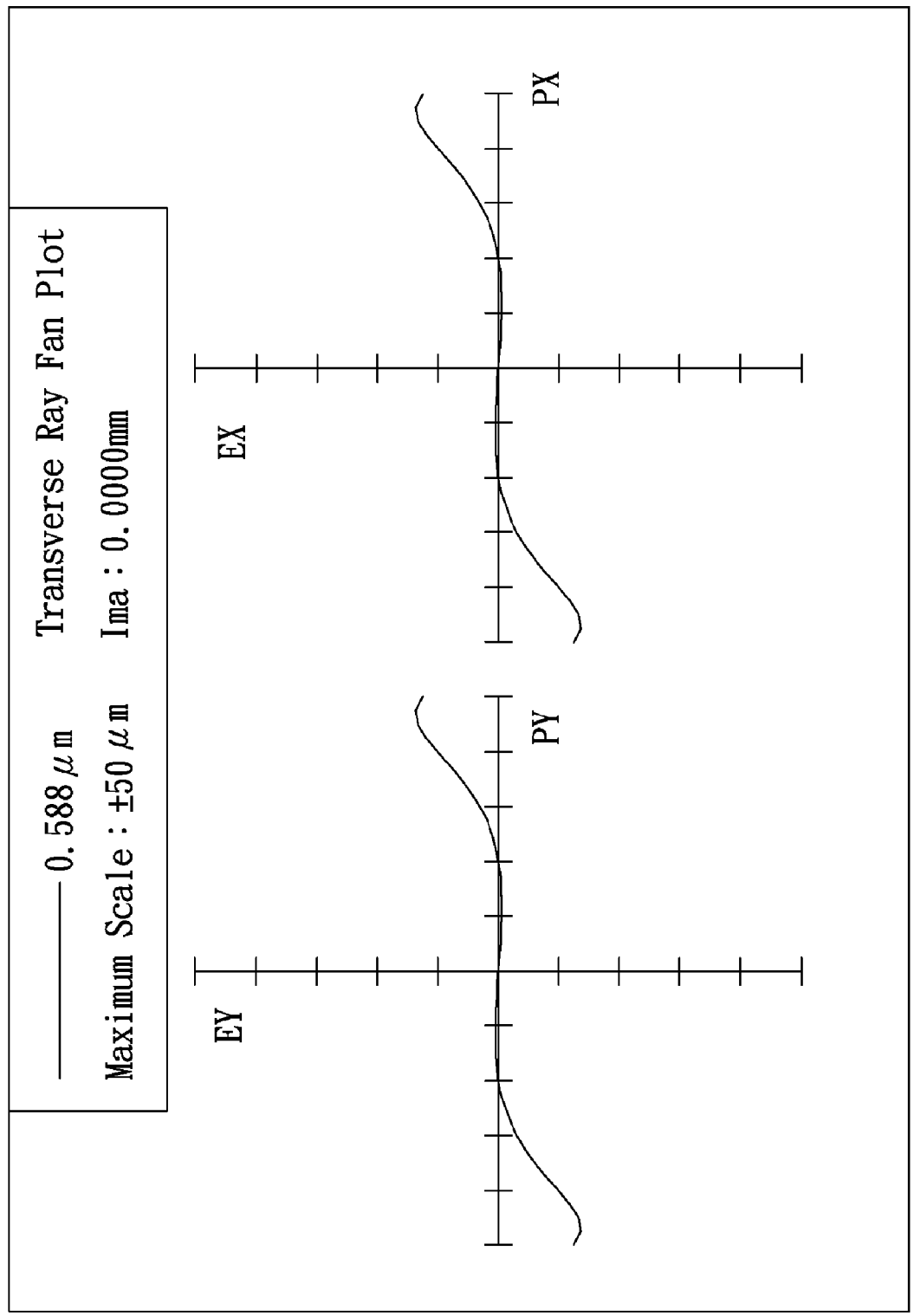
FIG. 4D is a transverse ray fan diagram of the zoom lens at the telephoto end in accordance with the first embodiment of the invention.
Figure 4E:
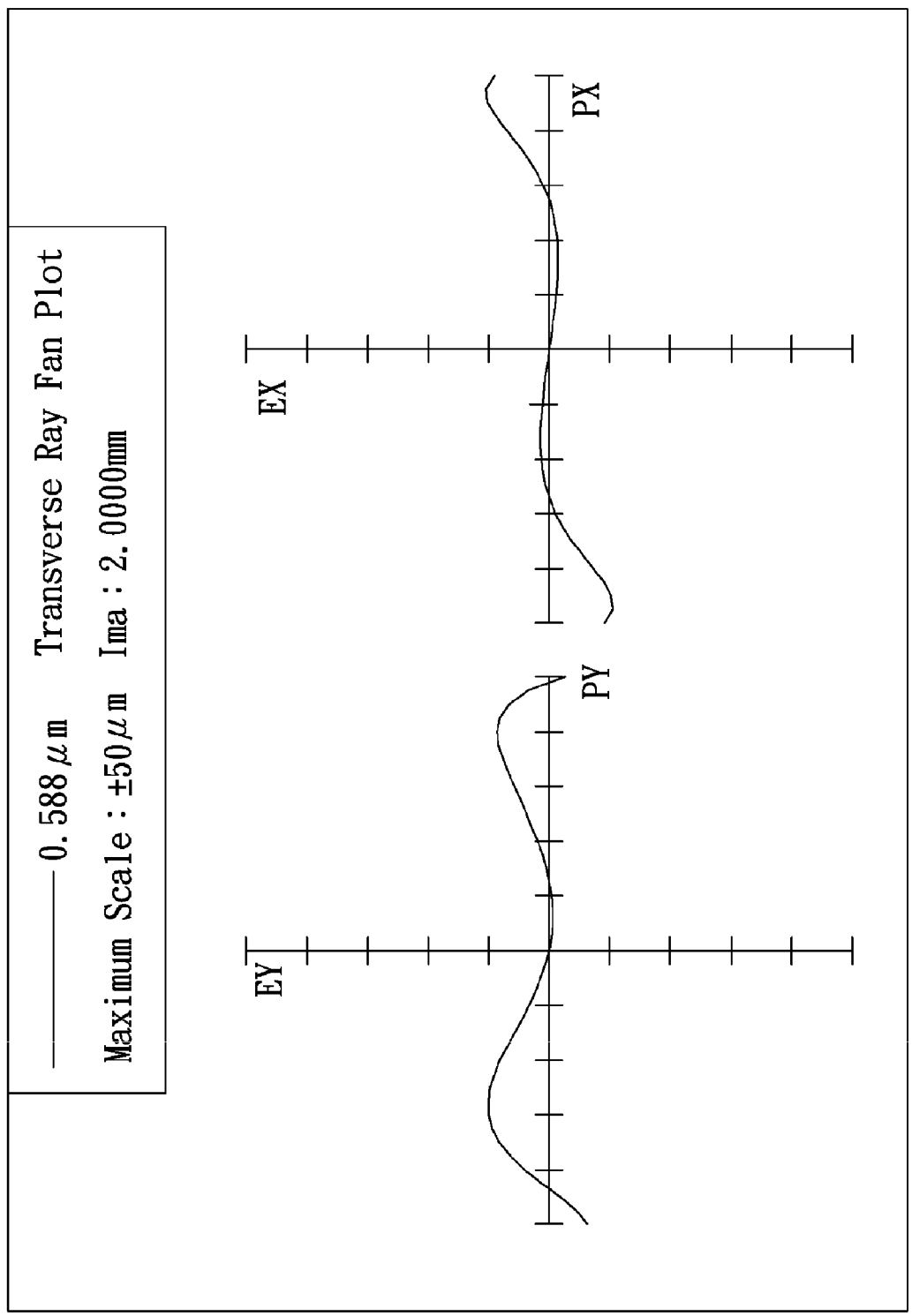
FIG. 4E is a transverse ray fan diagram of the zoom lens at the telephoto end in accordance with the first embodiment of the invention.
Figure 4F:
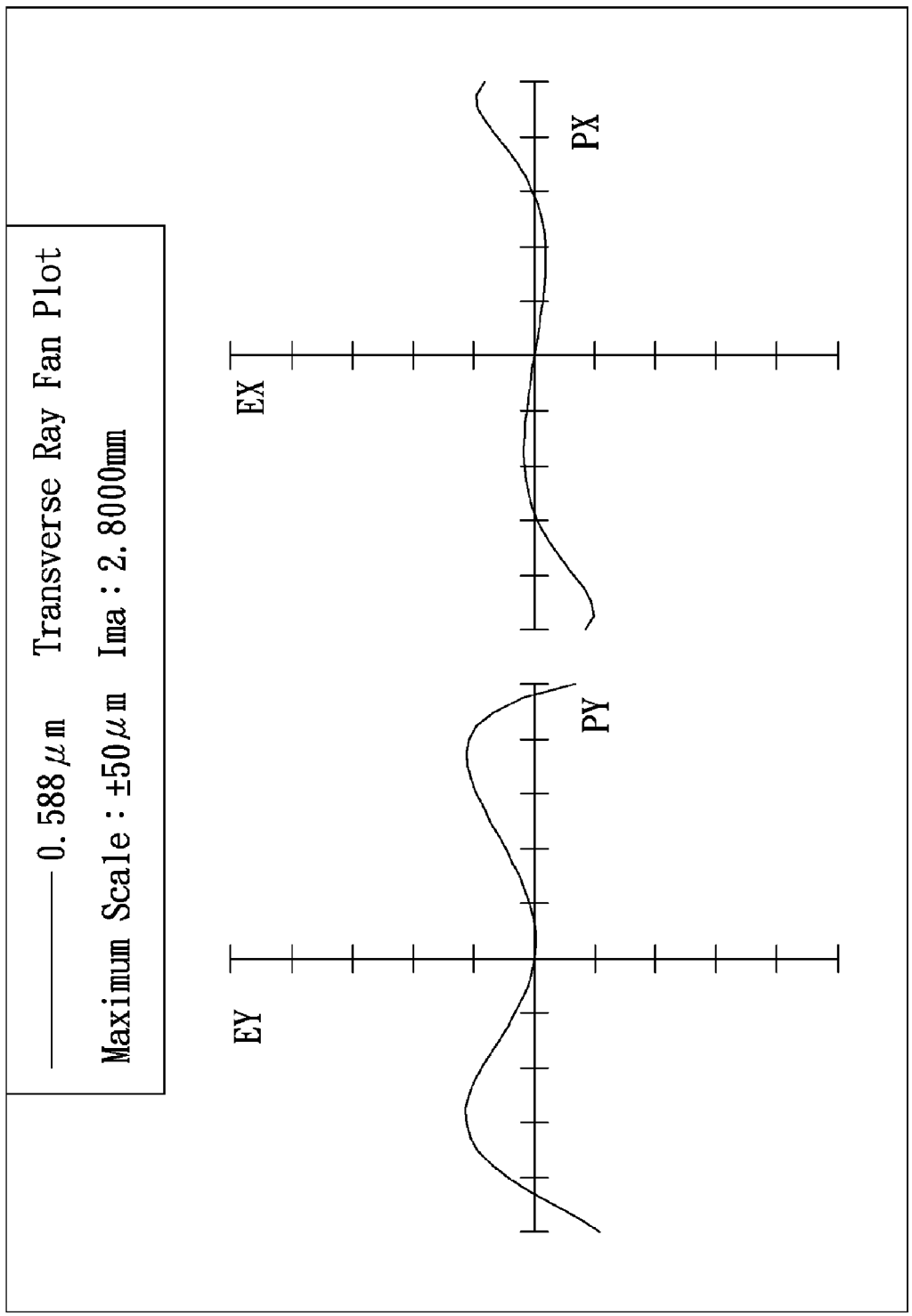
FIG. 4F is a transverse ray fan diagram of the zoom lens at the telephoto end in accordance with the first embodiment of the invention.
Figure 4G:
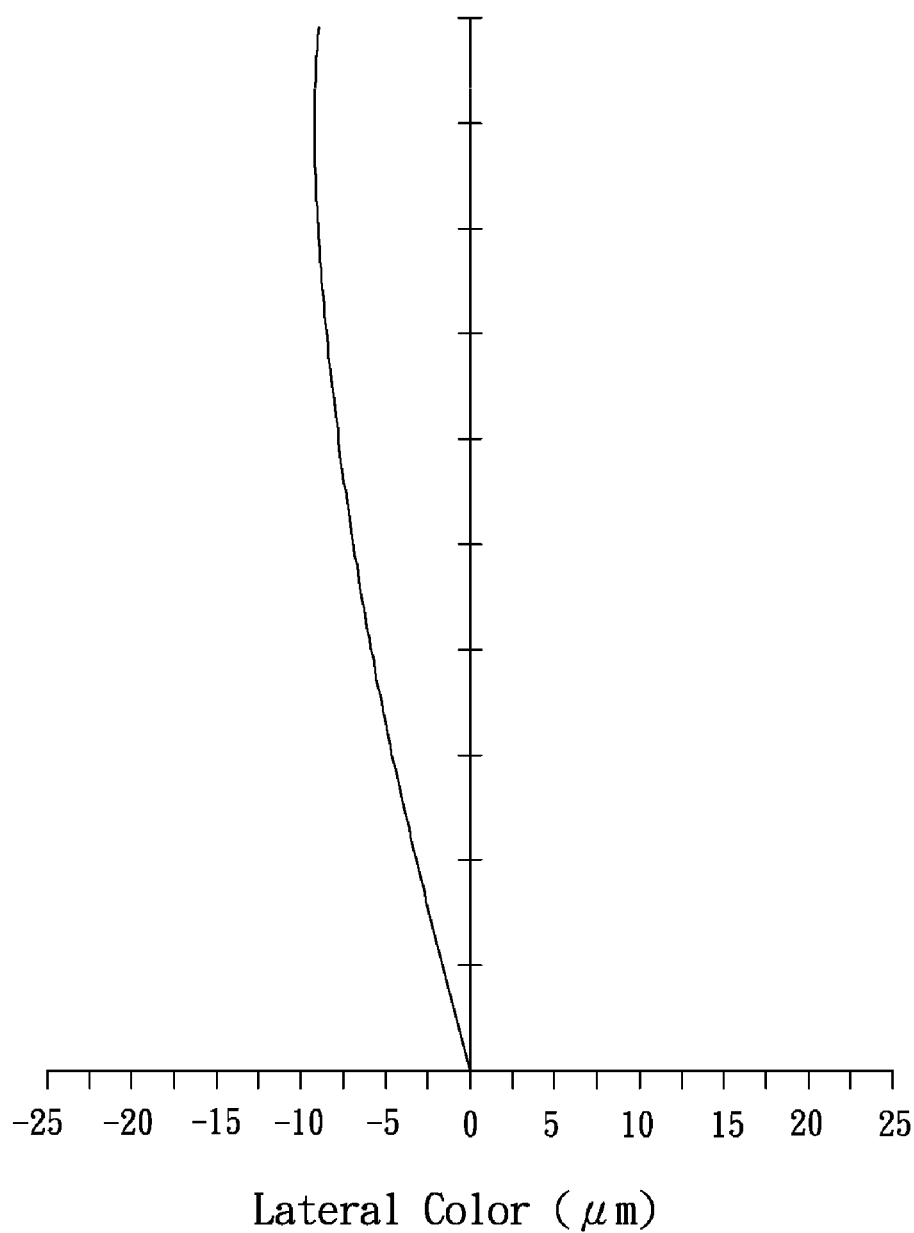
FIG. 4G is a lateral color diagram of the zoom lens at the telephoto end in accordance with the first embodiment of the invention.

By the above arrangements of the lenses and stop ST1, the zoom lens 1 of the present embodiment at the wide-angle end, medium end (not shown) and telephoto end (not shown) can meet the requirements of optical performance as seen in FIGS. 2A-2G, FIGS. 3A-3G and FIGS. 4A-4G wherein FIG. 2A, FIG. 3A and FIG. 4A show the longitudinal aberration diagram of the zoom lens 1 of the present embodiment at the wide-angle end, medium end and telephoto end, FIG. 2B, FIG. 3B and FIG. 4B show the field curvature diagram of the zoom lens 1 of the present embodiment at the wide-angle end, medium end and telephoto end, FIG. 2C, FIG. 3C and FIG. 4C show the distortion diagram of the zoom lens 1 of the present embodiment at the wide-angle end, medium end and telephoto end, FIGS. 2D-2F, FIGS. 3D-3F and FIGS. 4D-4F show the transverse ray fan diagram of the zoom lens 1 of the present embodiment at the wide-angle end, medium end and telephoto end, and FIG. 2G, FIG. 3G and FIG. 4G show the lateral color diagram of the zoom lens 1 of the present embodiment at the wide-angle end, medium end and telephoto end.

It can be seen from FIG. 2A that the longitudinal aberration in the zoom lens 1 of the present embodiment at the wide-angle end ranges between −0.1 mm and 0.0 mm for the wavelength of 0.588 μm. It can be seen from FIG. 2B that the field curvature of tangential direction and sagittal direction in the zoom lens 1 of the present embodiment at the wide-angle end ranges between −0.015 mm and 0.0 mm for the wavelength of 0.588 μm. It can be seen from FIG. 2C that the distortion in the zoom lens 1 of the present embodiment at the wide-angle end does not exceed plus or minus 9% for the wavelength of 0.588 μm. It can be seen from FIG. 2D, FIG. 2E and FIG. 2F that the transverse ray aberration of different image highs in the zoom lens 1 of the present embodiment at the wide-angle end does not exceed plus or minus 20 μm for the wavelength of 0.588 μm. It can be seen from FIG. 2G that the lateral color of different fields in the zoom lens 1 of the present embodiment at the wide-angle end ranges between 0 μm and 5 μm for the wavelength range between 0.436 μm and 0.656 μm. It is obvious that the longitudinal aberration, the field curvature, the distortion, the transverse ray aberration and the lateral color of the zoom lens 1 of the present embodiment at the wide-angle end can be corrected effectively, thereby capable of obtaining good optical performance.

It can be seen from FIG. 3A that the longitudinal aberration in the zoom lens 1 of the present embodiment at the medium end ranges between −0.05 mm and 0.0 mm for the wavelength of 0.588 μm. It can be seen from FIG. 3B that the field curvature of tangential direction and sagittal direction in the zoom lens 1 of the present embodiment at the medium end ranges between −0.04 mm and 0.0 mm for the wavelength of 0.588 μm. It can be seen from FIG. 3C that the distortion in the zoom lens 1 of the present embodiment at the medium end does not exceed plus or minus 1% for the wavelength of 0.588 μm. It can be seen from FIG. 3D, FIG. 3E and FIG. 3F that the transverse ray aberration of different image highs in the zoom lens 1 of the present embodiment at the medium end does not exceed plus or minus 15 μm for the wavelength of 0.588 μm. It can be seen from FIG. 3G that the lateral color of different fields in the zoom lens 1 of the present embodiment at the medium end ranges between 0 μm and 7 μm for the wavelength range between 0.436 μm and 0.656 μm. It is obvious that the longitudinal aberration, the field curvature, the distortion, the transverse ray aberration and the lateral color of the zoom lens 1 of the present embodiment at the medium end can be corrected effectively, thereby capable of obtaining good optical performance.

It can be seen from FIG. 4A that the longitudinal aberration in the zoom lens 1 of the present embodiment at the telephoto end ranges between 0.0 mm and 0.1 mm for the wavelength of 0.588 µm. It can be seen from FIG. 4B that the field curvature of tangential direction and sagittal direction in the zoom lens 1 of the present embodiment at the telephoto end ranges between −0.035 mm and 0.0 mm for the wavelength of 0.588 µm. It can be seen from FIG. 4C that the distortion in the zoom lens 1 of the present embodiment at the telephoto end does not exceed plus or minus 0.6% for the wavelength of 0.588 µm. It can be seen from FIG. 4D, FIG. 4E and FIG. 4F that the transverse ray aberration of different image highs in the zoom lens 1 of the present embodiment at the telephoto end does not exceed plus or minus 20 µm for the wavelength of 0.588 µm. It can be seen from FIG. 4G that the lateral color of different fields in the zoom lens 1 of the present embodiment at the telephoto end ranges between −10 µm and 0 µm for the wavelength range between 0.436 µm and 0.656 µm. It is obvious that the longitudinal aberration, the field curvature, the distortion, the transverse ray aberration and the lateral color of the zoom lens 1 of the present embodiment at the telephoto end can be corrected effectively, thereby capable of obtaining good optical performance.

Figure 5:
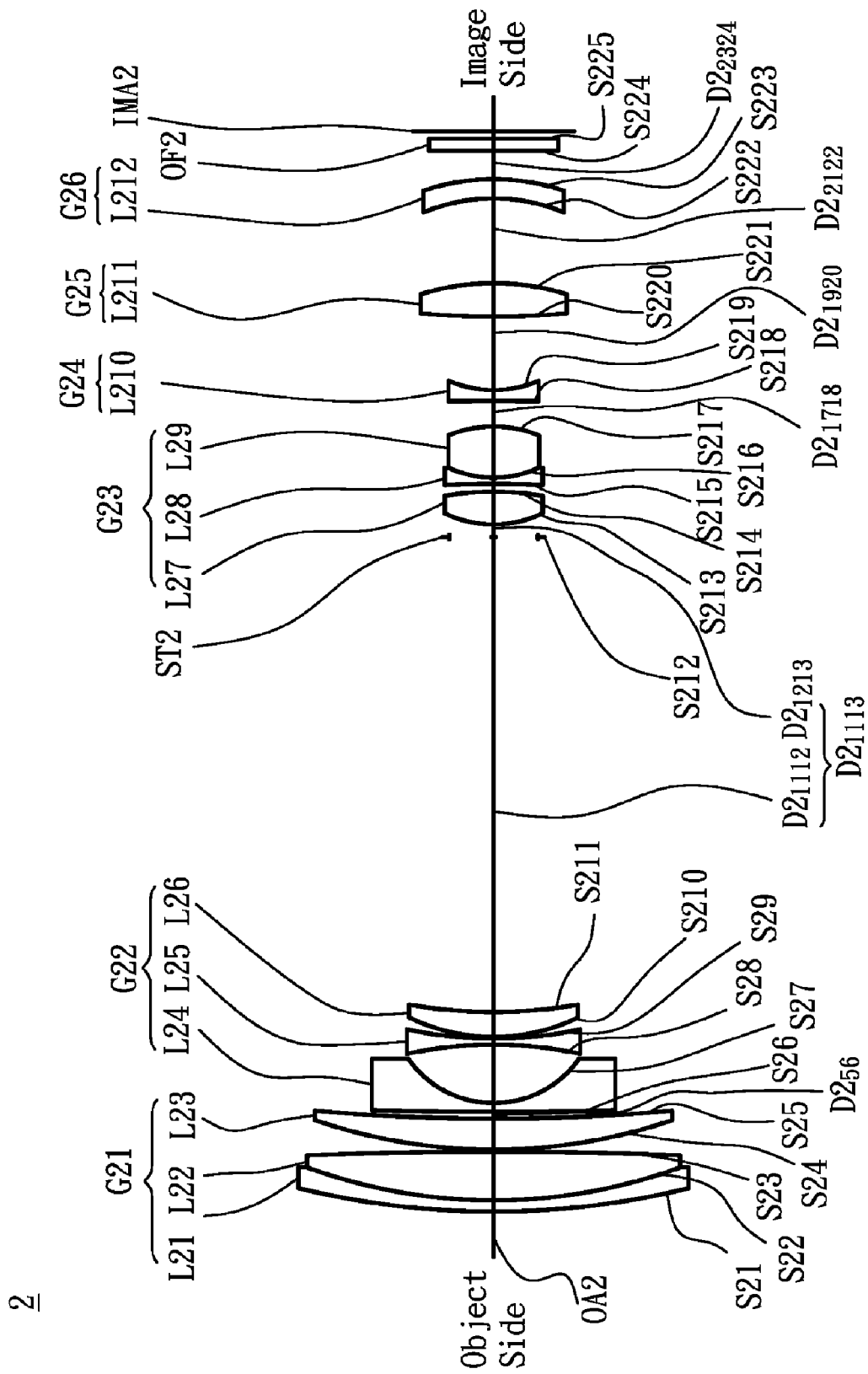
FIG. 5 is a lens layout diagram of a zoom lens at a wide-angle end in accordance with a second embodiment of the invention.

Referring to FIG. 5, FIG. 5 is a lens layout diagram of a zoom lens at a wide-angle end in accordance with a second embodiment of the invention. The zoom lens 2 includes a first lens group G21, a second lens group G22, a stop ST2, a third lens group G23, a fourth lens group G24, a fifth lens group G25, a sixth lens group G26 and an optical filter OF2, all of which are arranged in sequence from an object side to an image side along an optical axis OA2. An interval $D2_{56}$ between the first lens group G21 and the second lens group G22 increases, an interval $D2_{1113}$ between the second lens group G22 and the third lens group G23 decreases, an interval $D2_{1718}$ between the third lens group G23 and the fourth lens group G24 increases and then decreases, and the sixth lens group G26 is stationary, when the zoom lens 2 zooms from the wide-angle end to a telephoto end.

In the present embodiment, the first lens group G21 is with positive refractive power, the second lens group G22 is with negative refractive power, the third lens group G23 is with positive refractive power, the fourth lens group G24 is with negative refractive power, the fifth lens group G25 is with positive refractive power and the sixth lens group G26 is with positive refractive power.

The first lens group G21 includes a first lens L21, a second lens L22 and a third lens L23, all of which are arranged in sequence from the object side to the image side along the optical axis OA2. The image side surface S22 of the first lens L21 and the object side surface S22 of the second lens L22 are cemented.

The second lens group G22 includes a fourth lens L24, a fifth lens L25 and a sixth lens L26, all of which are arranged in sequence from the object side to the image side along the optical axis OA2.

The third lens group G23 includes a seventh lens L27, an eighth lens L28 and a ninth lens L29, all of which are arranged in sequence from the object side to the image side along the optical axis OA2. The seventh lens L27 is with positive refractive power. The eighth lens L28 is with negative refractive power. The ninth lens L29 is with positive refractive power. The image side surface S216 of the eighth lens L28 and the object side surface S216 of the ninth lens L29 are cemented.

The fourth lens group G24 includes a tenth lens L210. The tenth lens L210 is with negative refractive power and made of plastic material. The image side surface S219 of the tenth lens L210 is a concave surface.

The fifth lens group G25 includes an eleventh lens L211. The eleventh lens L211 is made of plastic material.

The sixth lens group G26 includes a twelfth lens L212. The twelfth lens L212 is made of plastic material.

An interval $D2_{1213}$ between the stop ST2 and the third lens group G23 is stationary. The optical filter OF2 is a glass plate and includes an object side surface S224 and an image side surface S225. Both of the object side surface S224 and the image side surface S225 are plane surfaces.

In order to maintain good optical performance of the zoom lens 2 in accordance with the present embodiment, the zoom lens 2 must satisfies the following four conditions:

$$|f_{2w}/f_{26}|<0.15 \tag{5}$$

$$Nd_{27}<1.565 \tag{6}$$

$$40<Vd_{27}<65 \tag{7}$$

$$Vd_{29}-Vd_{28}>35 \tag{8}$$

wherein $f_{2w}$ is an effective focal length of the zoom lens 2 at the wide-angle end, $f_{26}$ is an effective focal length of the sixth lens group G26, $Nd_{27}$ is a refractive index of the seventh lens L27, $Vd_{27}$ is an Abbe number of the seventh lens L27, $Vd_{28}$ is an Abbe number of the eighth lens L28 and $Vd_{29}$ is an Abbe number of the ninth lens L29.

Due to the above design of the lenses and stop ST2, the zoom lens 2 at a high zoom ratio is miniature and provided with a good optical performance. The zoom lens 2 at the wide-angle end also has a larger field of view.

In order to achieve the above purpose and effectively enhance the optical performance, the zoom lens 2 at the wide-angle end, a medium end (not shown) and the telephoto end (not shown) of the present embodiment of the invention is provided with the optical specifications shown in Table 3, which include an effective focal length, a radius of curvature of each lens surface, a thickness between adjacent surface, a refractive index of each lens and an Abbe number of each lens. Table 3 shows that the effective focal length, F-number, total lens length and field of view of the zoom lens 2 at the wide-angle end is equal to 4.43 mm, 3.65, 66.36 mm and 83.56 degrees, the effective focal length, F-number, total lens length and field of view of the zoom lens 2 at the medium end is equal to 21.50 mm, 5.62, 67.99 mm and 20.06 degrees, the effective focal length, F-number, total lens length and field of view of the zoom lens 2 at the telephoto end is equal to 104.30 mm, 6.15, 83.72 mm and 4.22 degrees, and the zoom ratio of the zoom lens 2 is about 23.55.

TABLE 3

|  | Effective Focal Length (mm) | F-number | Total Lens Length (mm) | Field of View (Degrees) |
| --- | --- | --- | --- | --- |
| W (Wide-angle End) | 4.43 | 3.65 | 66.36 | 83.56 |
| M (Medium End) | 21.50 | 5.62 | 67.99 | 20.06 |
| T (Telephoto End) | 104.30 | 6.15 | 83.72 | 4.22 |

TABLE 3-continued

| Surface Number | Radius of Curvature (mm) | Thickness (mm) | Nd | Vd | Remark |
|---|---|---|---|---|---|
| S21 | 50.750 | 0.70 | 2.00069 | 25.5 | The First Lens Group G21 The First Lens L21 |
| S22 | 33.809 | 3.00 | 1.49700 | 81.6 | The First Lens Group G21 The Second Lens L22 |
| S23 | −250.460 | 0.1 | | | |
| S24 | 33.700 | 1.90 | 1.64000 | 60.1 | The First Lens Group G21 The Third Lens L23 |
| S25 | 120.377 | 0.42(W) 13.76(M) 33.41(T) | | | Interval $D2_{56}$ |
| S26 | 231.984 | 0.50 | 1.75500 | 52.3 | The Second Lens Group G22 The Fourth Lens L24 |
| S27 | 6.515 | 3.60 | | | |
| S28 | −26.748 | 0.40 | 1.81600 | 46.6 | The Second Lens Group G22 The Fifth Lens L25 |
| S29 | 23.856 | 0.10 | | | |
| S210 | 11.828 | 1.50 | 1.95906 | 1.75 | The Second Lens Group G22 The Sixth Lens L26 |
| S211 | 27.822 | 29.20(W) 7.14(M) 1.00(T) | | | Interval $D2_{1112}$ |
| S212 | ∞ | 0.8 | | | Stop ST2 |
| S213 | 6.557 | 2.00 | 1.54814 | 45.8 | The Third Lens Group G23 The Seventh Lens L27 |
| S214 | −14.250 | 0.50 | | | |
| S215 | −50.660 | 0.35 | 1.85026 | 32.3 | The Third Lens Group G23 The Eighth Lens L28 |
| S216 | 6.455 | 3.15 | 1.48749 | 70.1 | The Third Lens Group G23 The Ninth Lens L29 |
| S217 | −7.653 | 1.52(W) 5.17(M) 4.13(T) | | | Interval $D2_{1718}$ |
| S218 | 80.550 | 0.70 | 1.53461 | 56.0 | The Fourth Lens Group G24 The Tenth Lens L210 |
| S219 | 6.086 | 4.55(W) 10.73(M) 15.79(T) | | | Interval $D2_{1920}$ |
| S220 | 75.782 | 2.00 | 1.53461 | 56.0 | The Fifth Lens Group G25 The Eleventh Lens L211 |
| S221 | −15.000 | 5.22(W) 5.74(M) 3.94(T) | | | Interval $D2_{2122}$ |
| S222 | −12.198 | 1.20 | 1.63558 | 23.9 | The Sixth Lens Group G26 The Twelfth Lens L212 |
| S223 | −12.510 | 1.73 | | | Interval $D2_{2324}$ |
| S224 | ∞ | 0.72 | 1.51633 | 64.1 | Optical Filter OF2 |
| S225 | ∞ | 0.50 | | | |

The aspheric surface sag z of each lens in table 3 can be calculated by the following formula:

$$Z=ch^2/\{1+[1-(k+1)c^2h^2]^{1/2}\}+Ah^4+Bh^6$$

where c is a curvature, h is a vertical distance from the lens surface to the optical axis, k is a conic constant and A and B are aspheric coefficients.

In the present embodiment, the conic constant k and the aspheric coefficients A, B of each surface are shown in Table 4.

TABLE 4

| Surface Number | k | A | B |
|---|---|---|---|
| S213 | 0 | −3.7969e−04 | 1.4211e−06 |
| S214 | 0 | 7.2625e−04 | −2.0452e−07 |
| S220 | 0 | 1.1226e−04 | −4.3072e−07 |
| S222 | 0 | −2.3769e−04 | 5.5359e−06 |

For the zoom lens 2 of the present embodiment, the effective focal length $f_{2w}$ of the zoom lens 2 at the wide-angle end is equal to 4.43 mm, the effective focal length $f_{26}$ of the sixth lens group G26 is equal to 1555.85 mm, the refractive index $Nd_{27}$ of the seventh lens L27 is equal to 1.54814, the Abbe number $Vd_{27}$ of the seventh lens L27 is equal to 45.8, the Abbe number $Vd_{28}$ of the eighth lens L28 is equal to 32.3, and the Abbe number $Vd_{29}$ of the ninth lens L29 is equal to 70.1. According to the above data, the following values can be obtained:

$$|f_{2w}/f_{26}|=0.0028,$$

$$Vd_{29}-Vd_{28}=37.8.$$

It is found that the above data and the obtained values satisfy the conditions (5)-(8).

By the above arrangements of the lenses and stop ST2, the zoom lens 2 of the present embodiment at the wide-angle end, medium end (not shown) and telephoto end (not shown) can meet the requirements of optical performance, wherein the longitudinal aberration, the field curvature, the distortion, the transverse ray aberration and the lateral color can be corrected effectively, thereby capable of obtaining good optical performance. Due to the similarity, the figures which depict the longitudinal aberration, the field curvature, the distortion, the transverse ray aberration and the lateral color of the second embodiment, are omitted.

Figure 6:
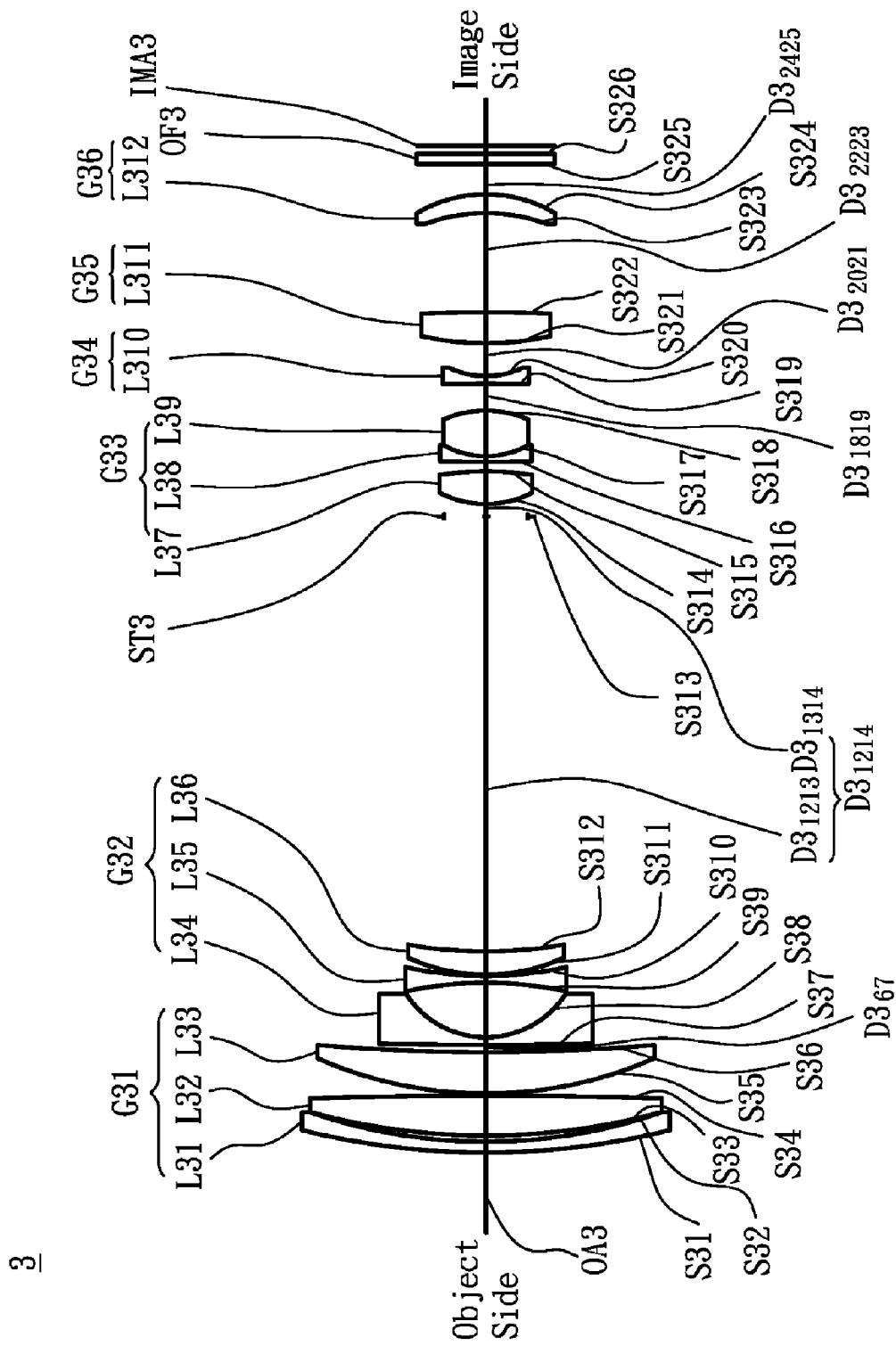
FIG. 6 is a lens layout diagram of a zoom lens at a wide-angle end in accordance with a third embodiment of the invention.

Referring to FIG. 6, FIG. 6 is a lens layout diagram of a zoom lens at a wide-angle end in accordance with a third embodiment of the invention. The zoom lens 3 includes a first lens group G31, a second lens group G32, a stop ST3, a third lens group G33, a fourth lens group G34, a fifth lens group G35, a sixth lens group G36 and an optical filter OF3, all of which are arranged in sequence from an object side to an image side along an optical axis OA3. An interval $D3_{67}$ between the first lens group G31 and the second lens group G32 increases, an interval $D3_{1214}$ between the second lens group G32 and the third lens group G33 decreases, an interval $D3_{1819}$ between the third lens group G33 and the fourth lens group G34 increases and then decreases, and the sixth lens group G36 is stationary, when the zoom lens 3 zooms from the wide-angle end to a telephoto end.

In the present embodiment, the first lens group G31 is with positive refractive power, the second lens group G32 is with negative refractive power, the third lens group G33 is with positive refractive power, the fourth lens group G34 is with negative refractive power, the fifth lens group G35 is with positive refractive power and the sixth lens group G36 is with positive refractive power.

The first lens group G31 includes a first lens L31, a second lens L32 and a third lens L33, all of which are arranged in sequence from the object side to the image side along the optical axis OA3.

The second lens group G32 includes a fourth lens L34, a fifth lens L35 and a sixth lens L36, all of which are arranged in sequence from the object side to the image side along the optical axis OA3.

The third lens group G33 includes a seventh lens L37, an eighth lens L38 and a ninth lens L39, all of which are arranged in sequence from the object side to the image side along the optical axis OA3. The seventh lens L37 is with positive refractive power. The eighth lens L38 is with negative refractive power. The ninth lens L39 is with positive refractive power. The image side surface S317 of the eighth lens L38 and the object side surface S317 of the ninth lens L39 are cemented.

The fourth lens group G34 includes a tenth lens L310. The tenth lens L310 is with negative refractive. The image side surface S320 of the tenth lens L310 is a concave surface.

The fifth lens group G35 includes an eleventh lens L311. The eleventh lens L311 is made of plastic material.

The sixth lens group G36 includes a twelfth lens L312. The twelfth lens L312 is made of plastic material.

An interval $D3_{1314}$ between the stop ST3 and the third lens group G33 is stationary. The optical filter OF3 is a glass plate and includes an object side surface S325 and an image side surface S326. Both of the object side surface S325 and the image side surface S326 are plane surfaces.

In order to maintain good optical performance of the zoom lens 3 in accordance with the present embodiment, the zoom lens 3 must satisfies the following four conditions:

$$|f_{3w}/f_{36}|<0.15 \tag{9}$$

$$Nd_{37}<1.565 \tag{10}$$

$$40<Vd_{37}<65 \tag{11}$$

$$Vd_{39}-Vd_{38}>35 \tag{12}$$

wherein $f_{3w}$ is an effective focal length of the zoom lens 3 at the wide-angle end, $f_{36}$ is an effective focal length of the sixth lens group G36, $Nd_{37}$ is a refractive index of the seventh lens L37, $Vd_{37}$ is an Abbe number of the seventh lens L37, $Vd_{38}$ is an Abbe number of the eighth lens L38 and $Vd_{39}$ is an Abbe number of the ninth lens L39.

Due to the above design of the lenses and stop ST3, the zoom lens 3 at a high zoom ratio is miniature and provided with a good optical performance. The zoom lens 3 at the wide-angle end also has a larger field of view.

In order to achieve the above purpose and effectively enhance the optical performance, the zoom lens 3 at the wide-angle end, a medium end (not shown) and the telephoto end (not shown) of the present embodiment of the invention is provided with the optical specifications shown in Table 5, which include an effective focal length, a radius of curvature of each lens surface, a thickness between adjacent surface, a refractive index of each lens and an Abbe number of each lens. Table 5 shows that the effective focal length, F-number, total lens length and field of view of the zoom lens 3 at the wide-angle end is equal to 4.43 mm, 3.71, 64.38 mm and 83.61 degrees, the effective focal length, F-number, total lens length and field of view of the zoom lens 3 at the medium end is equal to 21.49 mm, 5.59, 73.11 mm and 19.96 degrees, the effective focal length, F-number, total lens length and field of view of the zoom lens 3 at the telephoto end is equal to 104.30 mm, 6.22, 85.32 mm and 4.20 degrees, and the zoom ratio of the zoom lens 3 is about 23.54.

TABLE 5

| | Effective Focal Length (mm) | F-number | Total Lens Length (mm) | Field of View (Degrees) |
|---|---|---|---|---|
| W (Wide-angle End) | 4.43 | 3.71 | 64.38 | 83.62 |
| M (Medium End) | 21.49 | 5.59 | 73.11 | 19.96 |
| T (Telephoto End) | 104.30 | 6.22 | 85.32 | 4.20 |

| Surface Number | Radius of Curvature (mm) | Thickness (mm) | Nd | Vd | Remark |
|---|---|---|---|---|---|
| S31 | 51.000 | 0.70 | 2.00069 | 25.5 | The First Lens Group G31 The First Lens L31 |
| S32 | 35.577 | 0.39 | | | |
| S33 | 44.338 | 2.58 | 1.43875 | 95.0 | The First Lens Group G31 The Second Lens L32 |
| S34 | −272.923 | 0.1 | | | |
| S35 | 28.100 | 2.65 | 1.59522 | 67.7 | The First Lens Group G31 The Third Lens L33 |
| S36 | 136.853 | 0.45(W) 17.73(M) 34.284(T) | | | Interval $D3_{67}$ |
| S37 | 282.950 | 0.50 | 1.72916 | 54.7 | The Second Lens Group G32 The Fourth Lens L34 |

TABLE 5-continued

| | | | | | |
|---|---|---|---|---|---|
| S38 | 6.319 | 3.50 | | | |
| S39 | −22.440 | 0.40 | 1.81600 | 46.6 | The Second Lens Group G32 The Fifth Lens L35 |
| S310 | 22.440 | 0.10 | | | |
| S311 | 12.326 | 1.50 | 1.95906 | 1.75 | The Second Lens Group G32 The Sixth Lens L36 |
| S312 | 33.890 | 27.80(W) 9.18(M) 1.00(T) | | | Interval $D3_{1213}$ |
| S313 | ∞ | 0.8 | | | Stop ST3 |
| S314 | 6.212 | 2.10 | 1.50756 | 52.0 | The Third Lens Group G33 The Seventh Lens L37 |
| S315 | −13.167 | 0.60 | | | |
| S316 | −178.758 | 0.35 | 1.80100 | 35.0 | The Third Lens Group G33 The Eighth Lens L38 |
| S317 | 5.768 | 2.90 | 1.48749 | 70.1 | The Third Lens Group G33 The Ninth Lens L39 |
| S318 | −7.335 | 1.72(W) 3.66(M) 3.97(T) | | | Interval $D3_{1819}$ |
| S319 | ∞ | 0.5 | 1.65844 | 50.9 | The Fourth Lens Group G34 The Tenth Lens L310 |
| S320 | 6.000 | 2.10(W) 9.33(M) 11.25(T) | | | Interval $D3_{2021}$ |
| S321 | 22.730 | 2.00 | 1.53461 | 56.0 | The Fifth Lens Group G35 The Eleventh Lens L311 |
| S322 | −63.486 | 6.34(W) 7.24(M) 8.85(T) | | | Interval $D3_{2223}$ |
| S323 | −14.973 | 1.20 | 1.63558 | 23.9 | The Sixth Lens Group G36 The Twelfth Lens L312 |
| S324 | −8.885 | 1.88 | | | Interval $D3_{2425}$ |
| S325 | ∞ | 0.72 | 1.51633 | 64.1 | Optical Filter OF3 |
| S326 | ∞ | 0.50 | | | |

The aspheric surface sag z of each lens in table 5 can be calculated by the following formula:

$$Z=ch^2/\{1+[1-(k+1)c^2h^2]^{1/2}\}+Ah^4+Bh^6+Ch^8$$

where c is a curvature, h is a vertical distance from the lens surface to the optical axis, k is a conic constant and A, B and C are aspheric coefficients.

In the present embodiment, the conic constant k and the aspheric coefficients A, B, C of each surface are shown in Table 6.

TABLE 6

| Surface Number | k | A | B | C |
|---|---|---|---|---|
| S314 | 0 | −4.1458e−04 | −8.2953e−06 | 0 |
| S315 | 0 | 9.728e−04 | −1.0528e−05 | 0 |
| S321 | 0 | 2.2362e−04 | 3.2213e−07 | 0 |
| S323 | 0 | −6.8958e−04 | 3.2503e−07 | 3.5046e−8 |

For the zoom lens 3 of the present embodiment, the effective focal length $f_{3w}$ of the zoom lens 3 at the wide-angle end is equal to 4.43 mm, the effective focal length $f_{36}$ of the sixth lens group G36 is equal to 31.94 mm, the refractive index $Nd_{37}$ of the seventh lens L37 is equal to 1.50756, the Abbe number $Vd_{37}$ of the seventh lens L37 is equal to 52.0, the Abbe number $Vd_{38}$ of the eighth lens L38 is equal to 35.0, and the Abbe number $Vd_{39}$ of the ninth lens L39 is equal to 70.1. According to the above data, the following values can be obtained:

$$|f_{3w}/f_{36}|=0.1387,$$

$$Vd_{39}-Vd_{38}=35.1.$$

It is found that the above data and the obtained values satisfy the conditions (9)-(12).

By the above arrangements of the lenses and stop ST3, the zoom lens 3 of the present embodiment at the wide-angle end, medium end (not shown) and telephoto end (not shown) can meet the requirements of optical performance, wherein the longitudinal aberration, the field curvature, the distortion, the transverse ray aberration and the lateral color can be corrected effectively, thereby capable of obtaining good optical performance. Due to the similarity, the figures which depict the longitudinal aberration, the field curvature, the distortion, the transverse ray aberration and the lateral color of the third embodiment, are omitted.

While the invention has been described by way of examples and in terms of embodiments, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A zoom lens comprising a first lens group, a second lens group, a third lens group, a fourth lens group, a fifth lens group and a sixth lens group, all of which are arranged in sequence from an object side to an image side along an optical axis, wherein:
    the first lens group is with positive refractive power;
    the second lens group is with negative refractive power;
    the third lens group is with positive refractive power;
    the fourth lens group is with negative refractive power;
    the fifth lens group is with positive refractive power; and
    the zoom lens satisfies the following condition: $|f_w/f_6|<0.15$, wherein $f_w$ is an effective focal length of the zoom lens at a wide-angle end and $f_6$ is an effective focal length of the sixth lens group.

2. The zoom lens as claimed in claim 1, wherein an interval between the first lens group and the second lens group increases, an interval between the second lens group and the third lens group decreases, an interval between the third lens group and the fourth lens group increases and then decreases, and the sixth lens group is stationary, when the zoom lens zooms from the wide-angle end to a telephoto end.

3. The zoom lens as claimed in claim 1, wherein the first lens group comprises a first lens, a second lens and a third lens, all of which are arranged in sequence from the object side to the image side along the optical axis, the second lens group comprises a fourth lens, a fifth lens and a sixth lens, all of which are arranged in sequence from the object side to the image side along the optical axis.

4. The zoom lens as claimed in claim 1, wherein the fourth lens group comprises a tenth lens, the tenth lens is with negative refractive power and comprises a concave surface facing the image side.

5. The zoom lens as claimed in claim 1, wherein the fifth lens group comprises an eleventh lens, the sixth lens group comprises a twelfth lens, and the eleventh lens and the twelfth lens are made of plastic material.

6. The zoom lens as claimed in claim 1, further comprising an optical filter disposed between the sixth lens group and an image plane.

7. The zoom lens as claimed in claim 1, further comprising a stop disposed between the second lens group and the third lens group.

8. The zoom lens as claimed in claim 7, wherein an interval between the stop and the third lens group is stationary.

9. The zoom lens as claimed in claim 1, wherein the third lens group comprises a seventh lens, an eighth lens and a ninth lens, all of which are arranged in sequence from the object side to the image side along the optical axis, wherein the eighth lens and the ninth lens are cemented, the seventh lens is with positive refractive power, the eighth lens is with negative refractive power and the ninth lens is with positive refractive power.

10. The zoom lens as claimed in claim 9, wherein the seventh lens satisfies conditions of:

$Nd_7 < 1.565,$ $40 < Vd_7 < 65,$ wherein $Nd_7$ is a refractive index of the seventh lens and $Vd_7$ is an Abbe number of the seventh lens.

11. The zoom lens as claimed in claim 9, wherein the eighth lens and the ninth lens satisfy a condition of:

$Vd_9 - Vd_8 > 35,$ wherein $Vd_8$ is an Abbe number of the eighth lens and $Vd_9$ is an Abbe number of the ninth lens.

12. A zoom lens comprising a first lens group, a second lens group, a third are arranged in sequence from an object side to an image side along an optical axis, wherein:
the first lens group is with positive refractive power;
the second lens group is with negative refractive power;
the third lens group is with positive refractive power;
the fourth lens group is with negative refractive power;
the fifth lens group is with positive refractive power; and
an interval between the first lens group and the second lens group increases, an interval between the second lens group and the third lens group decreases, an interval between the third lens group and the fourth lens group increases and then decreases, and the sixth lens group is stationary, when the zoom lens zooms from a wide-angle end to a telephoto end.

13. The zoom lens as claimed in claim 12, wherein the zoom lens satisfies condition of:

$|f_w/f_6| < 0.15,$ wherein $f_w$ is an effective focal length of the zoom lens at the wide-angle end and $f_6$ is an effective focal length of the sixth lens group.

14. The zoom lens as claimed in claim 12, wherein the fourth lens group comprises a tenth lens, the tenth lens is with negative refractive power and comprises a concave surface facing the image side.

15. The zoom lens as claimed in claim 12, wherein the fifth lens group comprises an eleventh lens, the sixth lens group comprises a twelfth lens, and the eleventh lens and the twelfth lens are made of plastic material.

16. The zoom lens as claimed in claim 12, further comprising a stop disposed between the second lens group and the third lens group.

17. The zoom lens as claimed in claim 16, wherein an interval between the stop and the third lens group is stationary.

18. The zoom lens as claimed in claim 12, wherein the third lens group comprises a seventh lens, an eighth lens and a ninth lens, all of which are arranged in sequence from the object side to the image side along the optical axis, wherein the eighth lens and the ninth lens are cemented, the seventh lens is with positive refractive power, the eighth lens is with negative refractive power and the ninth lens is with positive refractive power.

19. The zoom lens as claimed in claim 18, wherein the seventh lens satisfies conditions of:

$Nd_7 < 1.565,$ $40 < Vd_7 < 65,$ wherein $Nd_7$ is a refractive index of the seventh lens and $Vd_7$ is an Abbe number of the seventh lens.

20. The zoom lens as claimed in claim 18, wherein the eighth lens and the ninth lens satisfy a condition of:

$Vd_9 - Vd_8 > 35,$ wherein $Vd_8$ is an Abbe number of the eighth lens and $Vd_9$ is an Abbe number of the ninth lens.

* * * * *